US010206226B2

United States Patent
Jha et al.

(10) Patent No.: US 10,206,226 B2
(45) Date of Patent: Feb. 12, 2019

(54) COORDINATION TECHNIQUES FOR RADIO RESOURCE CONTROL STATE MANAGEMENT IN DUAL-CONNECTIVITY ARCHITECTURES

(71) Applicant: INTEL CORPORATION, Santa Clara, CA (US)

(72) Inventors: Satish C. Jha, Hillsboro, OR (US); Ali T. Koc, Portland, OR (US); Kathiravetpillai Sivanesan, Richardson, TX (US); Rath Vannithamby, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 214 days.

(21) Appl. No.: 14/497,010

(22) Filed: Sep. 25, 2014

(65) Prior Publication Data
US 2015/0146599 A1 May 28, 2015

Related U.S. Application Data

(60) Provisional application No. 61/909,938, filed on Nov. 27, 2013.

(51) Int. Cl.
*H04W 52/02* (2009.01)
*H04W 74/04* (2009.01)
(Continued)

(52) U.S. Cl.
CPC .......... *H04W 74/04* (2013.01); *H04B 7/2621* (2013.01); *H04L 1/0026* (2013.01); *H04L 1/1825* (2013.01); *H04L 5/0007* (2013.01); *H04L 5/0032* (2013.01); *H04L 5/0051* (2013.01); *H04L 5/0073* (2013.01); *H04L 5/14* (2013.01); *H04L 27/2607* (2013.01);
(Continued)

(58) Field of Classification Search
None
See application file for complete search history.

(56) References Cited

U.S. PATENT DOCUMENTS 7,949,377 B2 * 5/2011 Islam ................ H04W 52/0251
455/154.1
8,588,169 B2 11/2013 Dinan
(Continued)

OTHER PUBLICATIONS

"Study on Small Cell Enhancements for EUTRA and EUTRAN—Higherlayer aspects", 3GPP TR 36.842, V12.0.0, section 5.2, Jan. 7, 2014, (Author unknown), 7 pages.
(Continued)

*Primary Examiner* — Willie J Daniel, Jr.

(57) ABSTRACT

Coordination techniques for radio resource control state management in dual-connectivity architectures are described. In one embodiment, for example, a master evolved node B (MeNB) may comprise logic, at least a portion of which is in hardware, the logic to send an inactivity notification message to indicate an expiration of an RRC_Inactivity_Timer for a dually-connected user equipment (UE), receive a state decision message in response to the inactivity notification message, and determine whether to transition the dually-connected UE to an RRC_Idle state based on the state decision message. Other embodiments are described and claimed.

19 Claims, 15 Drawing Sheets

(51) Int. Cl.

| | |
|---|---|
| *H04L 5/00* | (2006.01) |
| *H04L 5/14* | (2006.01) |
| *H04W 72/04* | (2009.01) |
| *H04L 1/18* | (2006.01) |
| *H04L 29/08* | (2006.01) |
| *H04W 40/30* | (2009.01) |
| *H04L 12/825* | (2013.01) |
| *H04W 28/02* | (2009.01) |
| *H04W 16/14* | (2009.01) |
| *H04B 7/26* | (2006.01) |
| *H04L 27/26* | (2006.01) |
| *H04W 72/02* | (2009.01) |
| *H04L 1/00* | (2006.01) |
| *H04W 76/28* | (2018.01) |
| *H04W 76/27* | (2018.01) |
| *H04L 29/06* | (2006.01) |
| *H04W 88/06* | (2009.01) |
| *H04W 88/10* | (2009.01) |
| *H04W 36/00* | (2009.01) |
| *H04W 84/12* | (2009.01) |
| *H04W 80/06* | (2009.01) |

(52) U.S. Cl.
CPC ............ *H04L 47/25* (2013.01); *H04L 69/161* (2013.01); *H04L 69/163* (2013.01); *H04L 69/321* (2013.01); *H04L 69/324* (2013.01); *H04L 69/326* (2013.01); *H04W 16/14* (2013.01); *H04W 28/0205* (2013.01); *H04W 40/30* (2013.01); *H04W 52/0216* (2013.01); *H04W 52/0254* (2013.01); *H04W 72/02* (2013.01); *H04W 72/042* (2013.01); *H04W 72/048* (2013.01); *H04W 72/0413* (2013.01); *H04W 72/0446* (2013.01); *H04W 72/0453* (2013.01); *H04W 76/27* (2018.02); *H04W 76/28* (2018.02); *H04W 36/0083* (2013.01); *H04W 80/06* (2013.01); *H04W 84/12* (2013.01); *H04W 88/06* (2013.01); *H04W 88/10* (2013.01); *Y02D 50/00* (2018.01); *Y02D 70/00* (2018.01); *Y02D 70/1222* (2018.01); *Y02D 70/1224* (2018.01); *Y02D 70/1226* (2018.01); *Y02D 70/1242* (2018.01); *Y02D 70/1244* (2018.01); *Y02D 70/1246* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/164* (2018.01); *Y02D 70/166* (2018.01); *Y02D 70/168* (2018.01); *Y02D 70/21* (2018.01); *Y02D 70/22* (2018.01); *Y02D 70/23* (2018.01); *Y02D 70/24* (2018.01)

(56) References Cited

U.S. PATENT DOCUMENTS

| | | | |
|---|---|---|---|
| 9,191,178 B2* | 11/2015 | Koc | H04W 76/00 |
| 9,271,324 B2* | 2/2016 | Cai | H04W 76/04 |
| 2005/0063304 A1 | 3/2005 | Sillasto et al. | |
| 2013/0003577 A1 | 1/2013 | Gupta et al. | |
| 2014/0171054 A1* | 6/2014 | Cai | H04W 76/04 455/418 |
| 2015/0004995 A1* | 1/2015 | Koc | H04B 7/0452 455/454 |

OTHER PUBLICATIONS

"Scenarios and Requirements for Small Cell Enhancements for EUTRA and EUTRAN", 3GPP TR 36.932, V12.1.0, Mar. 18, 2013, (Author unknown), 14 pages.
"Technical Specification Group Radio Access Network; Evolved Universal Terrestrial Radio Access (E-UTRA); Radio Resource Control (RRC); Protocol specification (Release 11)", 3GPP TS 36.331,V12.3.0 , (Sep. 2013), (Author unknown).
International Search Report and Written Opinion received for PCT Patent Application No. PCT/US2014/067826, dated Mar. 18, 2015, 17 pages.
"Considerations of Small Cell RRC Message Transmission", 3GPP TSG RAN WG2 Meeting #83, R2-132441, BlackBerry UK Limited, Aug. 19-23, 2013, 7 pages.
"One RRC entity versus multiple RRC entities", 3GPP TSG RAN2 Meeting #83, R2-132669, NEC Corporation, Aug. 19-23, 2013, 5 pages.
"Handling of the RRC configuration from the SeNB", 3GPP TSG-RAN WG2 #84, R2-133888, ETRI, Nov. 11-15, 2013, 3 pages.
Extended European Search Report received for European Patent Application No. 14865220.9, dated Jul. 20, 2017, 10 pages.
DRX coordination for UE with single RF receiver chain, R2-134280, 3GPP TSG-RAN WG2 Meeting #84.
DRX coordination in dual connectivity, R2-134117, 3GPP TSG-RAN WG2 Meeting #84.
Considerations of Small Cell RRC Message Transmission, R2-132441 3GPPTSG-RANWG2 Meeting #83.

* cited by examiner

COORDINATION TECHNIQUES FOR RADIO RESOURCE CONTROL STATE MANAGEMENT IN DUAL-CONNECTIVITY ARCHITECTURES

RELATED CASE

This application claims priority to U.S. Provisional Patent Application No. 61/909,938, filed Nov. 27, 2013, the entirety of which is hereby incorporated by reference.

TECHNICAL FIELD

Embodiments herein generally relate to communications between devices in broadband wireless communications networks.

BACKGROUND

In the context of an evolved universal mobile telecommunications system (UMTS) terrestrial radio access network (E-UTRAN), a dual-connectivity architecture may generally enable user equipment (UE) to establish concurrent data connectivity with a master evolved node B (MeNB) and a secondary evolved node B (SeNB). If a dually-connected UE is required to observe a single radio resource control (RRC) state that applies to both the MeNB and the SeNB, then it may be desirable that the dually-connected UE observe an RRC_Connected state if it is using its data connectivity with either or both of the MeNB and the SeNB. As such, if the MeNB is responsible for managing the RRC state of the dually-connected UE, then the MeNB may require information regarding the dually-connected UE's use of its data connectivity with the SeNB. However, in conventional systems, the MeNB may have no way of obtaining such information, and thus may be unable to manage the RRC state of the dually-connected UE in such a way as to properly account for data activity between the UE and the SeNB.

DETAILED DESCRIPTION

Figure 1:
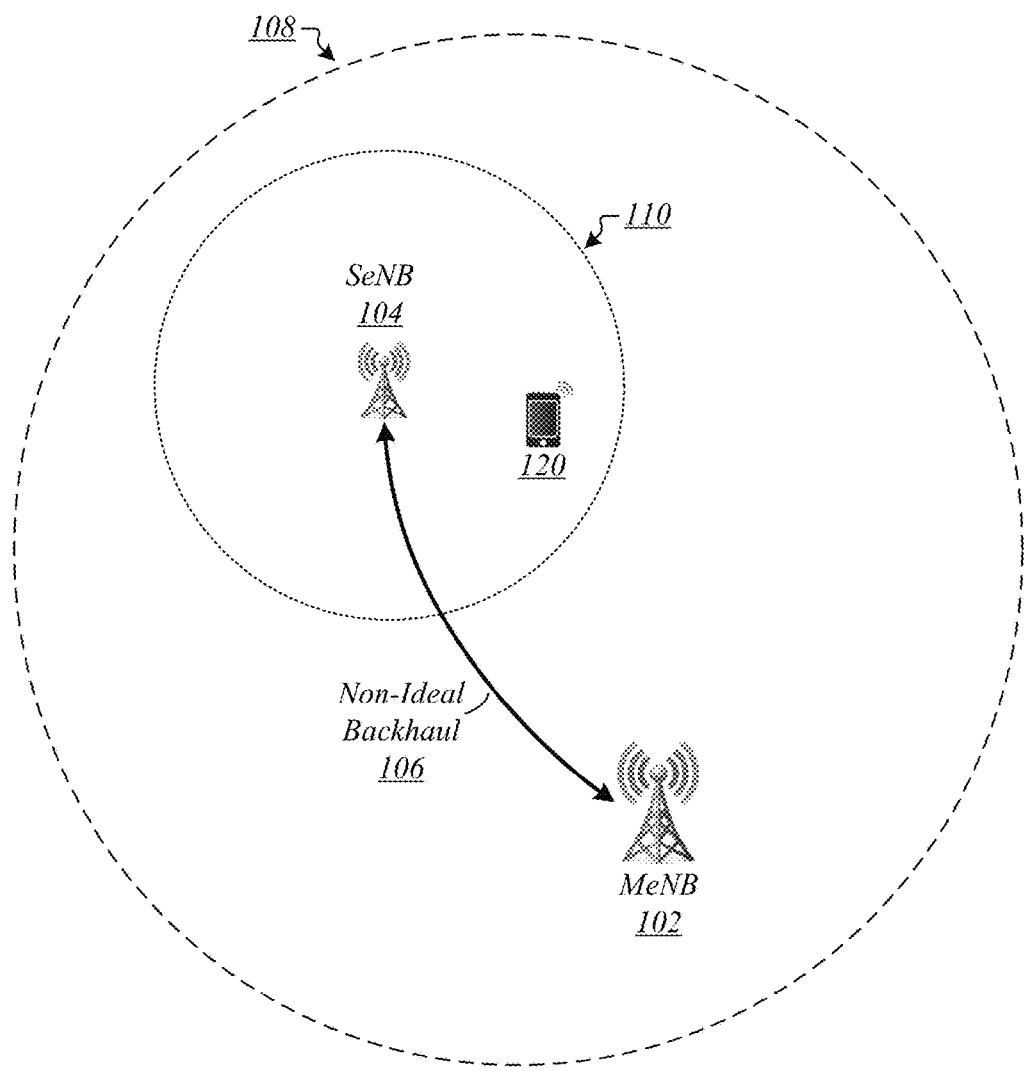
FIG. 1 illustrates an embodiment of an operating environment.

Various embodiments may be generally directed to coordination techniques for radio resource control state management in dual-connectivity architectures. In one embodiment, for example, a master evolved node B (MeNB) may comprise logic, at least a portion of which is in hardware, the logic to send an inactivity notification message to indicate an expiration of an RRC_Inactivity_Timer for a dually-connected user equipment (UE), receive a state decision message in response to the inactivity notification message, and determine whether to transition the dually-connected UE to an RRC_Idle state based on the state decision message. Other embodiments are described and claimed.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

The techniques disclosed herein may involve transmission of data over one or more wireless connections using one or more wireless mobile broadband technologies. For example, various embodiments may involve transmissions over one or more wireless connections according to one or more 3rd Generation Partnership Project (3GPP), 3GPP Long Term Evolution (LTE), and/or 3GPP LTE-Advanced (LTE-A) technologies and/or standards, including their predecessors, revisions, progeny, and/or variants. Various embodiments may additionally or alternatively involve transmissions according to one or more Global System for Mobile Communications (GSM)/Enhanced Data Rates for GSM Evolution (EDGE), Universal Mobile Telecommunications System (UMTS)/High Speed Packet Access (HSPA), and/or GSM with General Packet Radio Service (GPRS) system (GSM/GPRS) technologies and/or standards, including their predecessors, revisions, progeny, and/or variants.

Examples of wireless mobile broadband technologies and/or standards may also include, without limitation, any of the Institute of Electrical and Electronics Engineers (IEEE) 802.16 wireless broadband standards such as IEEE 802.16m and/or 802.16p, International Mobile Telecommunications Advanced (IMT-ADV), Worldwide Interoperability for Microwave Access (WiMAX) and/or WiMAX II, Code Division Multiple Access (CDMA) 2000 (e.g., CDMA2000 1×RTT, CDMA2000 EV-DO, CDMA EV-DV, and so forth), High Performance Radio Metropolitan Area Network (HIPERMAN), Wireless Broadband (WiBro), High Speed Downlink Packet Access (HSDPA), High Speed Orthogonal Frequency-Division Multiplexing (OFDM) Packet Access (HSOPA), High-Speed Uplink Packet Access (HSUPA) technologies and/or standards, including their predecessors, revisions, progeny, and/or variants.

Some embodiments may additionally or alternatively involve wireless communications according to other wireless communications technologies and/or standards. Examples of other wireless communications technologies and/or standards that may be used in various embodiments may include, without limitation, other IEEE wireless communication standards such as the IEEE 802.11, IEEE 802.11a, IEEE 802.11b, IEEE 802.11g, IEEE 802.11n, IEEE 802.11u, IEEE 802.11ac, IEEE 802.11ad, IEEE 802.11af, and/or IEEE 802.11ah standards, High-Efficiency Wi-Fi standards developed by the IEEE 802.11 High Efficiency WLAN (HEW) Study Group, Wi-Fi Alliance (WFA) wireless communication standards such as Wi-Fi, Wi-Fi Direct, Wi-Fi Direct Services, Wireless Gigabit (WiGig), WiGig Display Extension (WDE), WiGig Bus Extension (WBE), WiGig Serial Extension (WSE) standards and/or standards developed by the WFA Neighbor Awareness Networking (NAN) Task Group, machine-type communications (MTC) standards, and/or near-field communication (NFC) standards such as standards developed by the NFC Forum, including any predecessors, revisions, progeny, and/or variants of any of the above. The embodiments are not limited to these examples.

In addition to transmission over one or more wireless connections, the techniques disclosed herein may involve transmission of content over one or more wired connections through one or more wired communications media. Examples of wired communications media may include a wire, cable, metal leads, printed circuit board (PCB), backplane, switch fabric, semiconductor material, twisted-pair wire, co-axial cable, fiber optics, and so forth. The embodiments are not limited in this context.

FIG. 1 illustrates an example of an operating environment 100 such as may be representative of various embodiments. In the example operating environment 100 of FIG. 1, an MeNB 102 communicates with an SeNB 104 via a non-ideal backhaul 106. In some embodiments, non-ideal backhaul 106 may comprise a backhaul that is categorized as being non-ideal according to 3GPP TR 36.932 ver. 12.1.0 (released March 2013), and/or according to any predecessors, revisions, progeny, and/or variants thereof. SeNB 104 may generally provide wireless service within a small cell 110, and MeNB 102 may generally provide wireless service within an overlaid macro cell 108. In example operating environment 100, a UE 120 resides at a position located within small cell 110, and that position is also located within the overlaid macro cell 108.

In various embodiments, UE 120 may wirelessly communicate with MeNB 102 and/or SeNB 104 according to a set of wireless communications specifications, such as 3GPP Release 12 (Rel-12). In some embodiments, based on the set of wireless communications specifications, UE 120 may be configured with the capability of entering into a dual-connectivity mode of operation, according to which the UE 120 is provided with concurrent data connectivity to both MeNB 102 and SeNB 104. During dual-connectivity operation in various embodiments, UE 120 may be provided with data connectivity to MeNB 102 via a first data connection that utilizes a first wireless communication frequency, and may concurrently be provided with data connectivity to SeNB 104 via a second data connection that utilizes a second wireless communication frequency. In some embodiments, the set of wireless communications specifications may stipulate that UE 120 is to possess a single radio resource control (RRC) state that applies to both MeNB 102 and SeNB 104. In various embodiments, for example, UE 120 may be permitted either to be in an RRC_Connected state with respect to both MeNB 102 and SeNB 104 or to be in an RRC_Idle state with respect to both MeNB 102 and SeNB 104, but not permitted to be in an RRC_Connected state with respect to one while being in an RRC_Idle state with respect to the other.

In some embodiments, according to the set of wireless communication specifications, MeNB 102 may be responsible for transmitting RRC messages to UE 120 in conjunction with management of the RRC state of UE 120. In various embodiments, the set of wireless communications specifications may not support transmission of RRC messages on the part of SeNB 104. In some embodiments, if UE 120 is in an RRC_Connected state with data connectivity to both MeNB 102 and SeNB 104, it may be desirable that UE 120 be transitioned to an RRC_Idle state if it is not engaging in data communications with either MeNB 102 or SeNB 104. On the other hand, if UE 120 is engaging in data communications with one or both of MeNB 102 and SeNB 104, it may be desirable that UE 120 be maintained in the RRC_Connected state. As such, in order to properly manage the RRC state of UE 120, MeNB 102 may require both information regarding data activity between itself and UE 120 and information regarding data activity between SeNB 104 and UE 120. However, in conventional systems, MeNB 102 may not possess information regarding data activity between SeNB 104 and UE 120, and MeNB 102 and SeNB 104 may not be configured in such a way as to enable MeNB 102 to coordinate with SeNB 104 in order to obtain such information.

Described herein are coordination techniques for RRC state management in dual-connectivity architectures. According to various such techniques, an MeNB such as MeNB 102 may be configured to use an RRC state management handshake to coordinate with an SeNB such as SeNB 104 in conjunction with determining whether to transition a UE such as UE 120 from a connected RRC state to an idle RRC state. In some embodiments, the MeNB may be configured to coordinate with the SeNB by exchanging communications with the SeNB over a non-ideal backhaul, such as non-ideal backhaul 106. In various embodiments, the MeNB may be configured to exchange communications with the SeNB via an X2 interface connection implemented using the non-ideal backhaul.

According to some coordination techniques described herein, the RRC state management handshake may be designed to account for communication latency associated with use of the non-ideal backhaul. According to various such techniques, in order to account for non-ideal backhaul latency, a RRC state management handshake for a given UE may be initiated in advance of a potential expiration of an inactivity timer for that UE. According to some such techniques, an idle-pending condition may be defined, and may indicate with respect to a given UE that an ongoing RRC state management handshake may result in that UE being transitioned to an RRC_Idle state. In various embodiments, in response to determining an idle-pending condition for the UE, the SeNB may send a control message to inform the UE of the idle-pending condition, and the UE may at least temporarily refrain from initiating uplink (UL) transmissions to the SeNB. In some embodiments, the control message may comprise a medium access control (MAC) control element (CE). In various embodiments, if the ongoing RRC state management handshake does not result in the UE being transitioned to an RRC_Idle state, the SeNB may send a second control message to inform the UE that the idle-pending condition has ceased and that the UE may initiate UL transmissions to the SeNB. In some embodiments, the second control message may comprise a same MAC CE as is comprised in the first control message. The embodiments are not limited in this context.

Figure 2:
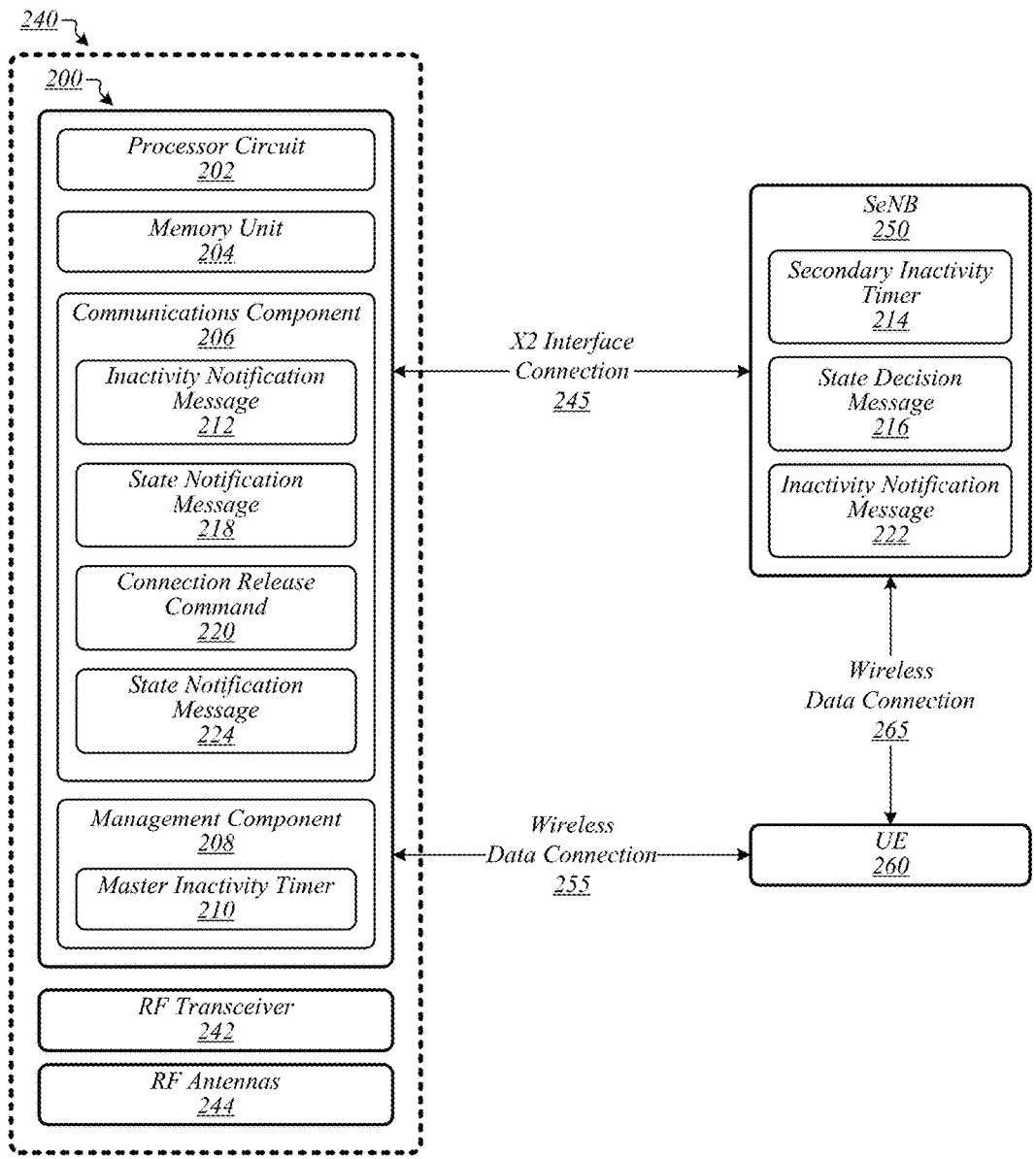
FIG. 2 illustrates an embodiment of a first apparatus and an embodiment of a first system.

FIG. 2 illustrates a block diagram of an apparatus 200. Apparatus 200 may be representative of an MeNB that may implement coordination techniques for RRC state management in dual-connectivity architectures in various embodiments. For example, apparatus 200 may be representative of MeNB 102 of FIG. 1. As shown in FIG. 2, apparatus 200 comprises multiple elements including a processor circuit 202, a memory unit 204, a communications component 206, and a management component 208. The embodiments, however, are not limited to the type, number, or arrangement of elements shown in this figure.

In some embodiments, apparatus 200 may comprise processor circuit 202. Processor circuit 202 may be implemented using any processor or logic device, such as a complex instruction set computer (CISC) microprocessor, a reduced instruction set computing (RISC) microprocessor, a very long instruction word (VLIW) microprocessor, an x86 instruction set compatible processor, a processor implementing a combination of instruction sets, a multi-core processor such as a dual-core processor or dual-core mobile processor, or any other microprocessor or central processing unit (CPU). Processor circuit 202 may also be implemented as a dedicated processor, such as a controller, a microcontroller, an embedded processor, a chip multiprocessor (CMP), a co-processor, a digital signal processor (DSP), a network processor, a media processor, an input/output (I/O) processor, a media access control (MAC) processor, a radio baseband processor, an application specific integrated circuit (ASIC), a field programmable gate array (FPGA), a programmable logic device (PLD), and so forth. In one embodiment, for example, processor circuit 202 may be implemented as a general purpose processor, such as a processor made by Intel® Corporation, Santa Clara, Calif. The embodiments are not limited in this context.

In various embodiments, apparatus 200 may comprise or be arranged to communicatively couple with a memory unit 204. Memory unit 204 may be implemented using any machine-readable or computer-readable media capable of storing data, including both volatile and non-volatile memory. For example, memory unit 204 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. It is worthy of note that some portion or all of memory unit 204 may be included on the same integrated circuit as processor circuit 202, or alternatively some portion or all of memory unit 204 may be disposed on an integrated circuit or other medium, for example a hard disk drive, that is external to the integrated circuit of processor circuit 202. Although memory unit 204 is comprised within apparatus 200 in FIG. 2, memory unit 204 may be external to apparatus 200 in some embodiments. The embodiments are not limited in this context.

In various embodiments, apparatus 200 may comprise a communications component 206. Communications component 206 may comprise logic, circuitry, and/or instructions operative to send messages to one or more remote devices and/or to receive messages from one or more remote devices. In some embodiments, communications component 206 may be operative to send and/or receive messages over one or more wired connections, one or more wireless connections, or a combination of both. In various embodiments, communications component 206 may additionally comprise logic, circuitry, and/or instructions operative to perform various operations in support of such communications. Examples of such operations may include selection of transmission and/or reception parameters and/or timing, packet and/or protocol data unit (PDU) construction and/or deconstruction, encoding and/or decoding, error detection, and/or error correction. The embodiments are not limited to these examples.

In some embodiments, apparatus 200 may comprise a management component 208. Management component 208 may comprise logic, circuitry, and/or instructions operative to track and/or manage the connectivity states and/or communication activities of one or more UEs or other mobile devices. In various embodiments, management component 208 may be configured to perform various determinations, decisions, selections, operations, and/or actions in conjunction with such tracking and/or management. In some embodiments, management component 208 may be configured to perform various determinations, decisions, selections, operations, and/or actions in support of coordination with an external control node such as an SeNB with regard to RRC state management for one or more dually-connected UEs. The embodiments are not limited in this context.

FIG. 2 also illustrates a block diagram of a system 240. System 240 may comprise any of the aforementioned elements of apparatus 200. System 240 may further comprise a radio frequency (RF) transceiver 242. RF transceiver 242 may comprise one or more radios capable of transmitting and receiving signals using various suitable wireless communications techniques. Such techniques may involve communications across one or more wireless networks. Exemplary wireless networks include (but are not limited to) cellular radio access networks, wireless local area networks (WLANs), wireless personal area networks (WPANs), wireless metropolitan area network (WMANs), and satellite networks. In communicating across such networks, RF transceiver 242 may operate in accordance with one or more applicable standards in any version. The embodiments are not limited in this context.

In various embodiments, system 240 may comprise one or more RF antennas 244. Examples of any particular RF antenna 244 may include, without limitation, an internal antenna, an omni-directional antenna, a monopole antenna, a dipole antenna, an end-fed antenna, a circularly polarized antenna, a micro-strip antenna, a diversity antenna, a dual antenna, a tri-band antenna, a quad-band antenna, and so forth. In some embodiments, RF transceiver 242 may be operative to send and/or receive messages and/or data using one or more RF antennas 244. The embodiments are not limited in this context.

During general operation, apparatus 200 and/or system 240 may be operative to provide wireless service within a macro cell such as macro cell 108 of FIG. 1. In various embodiments, apparatus 200 and/or system 240 may be operative to provide wireless service within a macro cell that is overlaid upon one or more small cells, such as small cell 110 of FIG. 1. In some embodiments, apparatus 200 and/or system 240 may be operative to communicate with an SeNB 250 that serves a small cell located within the macro cell served by apparatus 200 and/or system 240. In various embodiments, apparatus 200 and/or system 240 may be operative to communicate with SeNB 250 via an X2 interface connection 245. In some embodiments, the X2 interface connection 245 may be implemented using a non-ideal backhaul connection between apparatus 200 and/or system 240 and SeNB 250, such as non-ideal backhaul 106 of FIG. 1. The embodiments are not limited in this context.

In various embodiments, a UE 260 located within range of both apparatus 200 and/or system 240 and SeNB 250 may possess concurrent data connectivity with apparatus 200 and/or system 240 and SeNB 250. As used hereinafter, the term "dually-connected UE" denotes a UE that possesses concurrent data connectivity with an MeNB and an SeNB. In some embodiments, the dually-connected UE 260 may possess data connectivity with apparatus 200 and/or system 240 via a wireless data connection 255 and may possess data connectivity with SeNB 250 via a wireless data connection 265. In various embodiments, wireless data connections 255 and 265 may utilize different wireless communication frequencies. In some embodiments, dually-connected UE 260 may be configured to observe a same RRC state with respect to SeNB 250 as it does with respect to apparatus 200 and/or system 240. In various embodiments, dually-connected UE 260 may be configured either to observe an RRC_Connected state with respect to both SeNB 250 and apparatus 200 and/or system 240 or to observe an RRC_Idle state with respect to both SeNB 250 and apparatus 200 and/or system 240. In some embodiments, while in the dual-connectivity mode of operation, dually-connected UE 260 may observe an RRC_Connected state with respect to both SeNB 250 and apparatus 200 and/or system 240. In various embodiments, apparatus 200 and/or system 240 may be responsible for sending RRC messages to dually-connected UE 260 in order to provide dually-connected UE 260 with any desired instructions regarding its RRC state. In some embodiments, SeNB 250 may not be configured with the ability to send RRC messages to UEs, and thus may be unable to send RRC messages to dually-connected UE 260. The embodiments are not limited in this context.

In various embodiments, it may be desirable that dually-connected UE 260 be transitioned to the RRC_Idle state if it is neither engaging in data communications with apparatus 200 and/or system 240 nor engaging in data communications with SeNB 250. In some embodiments, it may be desirable that dually-connected UE 260 be maintained in the RRC_Connected state if it is engaging in data communications with apparatus 200 and/or system 240, engaging in data communications with SeNB 250, or both. In various embodiments, SeNB 250 may not be configured with the ability to send RRC messages to dually-connected UE 260, and thus apparatus 200 and/or system 240 may be tasked with instructing dually-connected UE 260 to enter the RRC_Idle state if dually-connected UE 260 is neither engaging in data communications with apparatus 200 and/or system 240 nor engaging in data communications with SeNB 250. The embodiments are not limited in this context.

In some embodiments, management component 208 may be operative to track data communications activity between dually-connected UE 260 and apparatus 200 and/or system 240. In various embodiments, management component 208 may be operative to maintain a master inactivity timer 210 for dually-connected UE 260. In some embodiments, master inactivity timer 210 may comprise an RRC_Inactivity_Timer. In various embodiments, master inactivity timer 210 may generally indicate whether dually-connected UE 260 and apparatus 200 and/or system 240 have exchanged data packets recently enough that dually-connected UE 260 is to be regarded as being engaged in data communications with apparatus 200 and/or system 240. In some embodiments, when master inactivity timer 210 is running, dually-connected UE 260 may be regarded as being engaged in data communications with apparatus 200 and/or system 240. In various embodiments, when master inactivity timer 210 has expired, dually-connected UE 260 may be regarded as not being engaged in data communications with apparatus 200 and/or system 240. In some embodiments, management component 208 may be operative to reset master inactivity timer 210 each time that dually-connected UE 260 exchanges data packets with apparatus 200 and/or system 240. For example, during ongoing operation of apparatus 200 and/or system 240 in some embodiments, communications component 206 may be operative to receive a data packet from dually-connected UE 260 and management component 208 may be operative to reset master inactivity timer 210 in response to the receipt of that data packet. The embodiments are not limited to this example.

In various embodiments, apparatus 200 and/or system 240 may not have awareness of whether dually-connected UE 260 is engaged in data communications with SeNB 250. Thus, upon expiration of master inactivity timer 210, apparatus 200 and/or system 240 may not possess all of the information it needs in order to properly determine whether to transition dually-connected UE 260 to the RRC_Idle state. As such, in some embodiments, apparatus 200 and/or system 240 may be configured to use an RRC state management handshake to coordinate with SeNB 250 in conjunction with determining whether to transition dually-connected UE 260 to the RRC_Idle state. The embodiments are not limited in this context.

In various embodiments, following a time interval during which no data packets are exchanged between dually-connected UE 260 and apparatus 200 and/or system 240, master inactivity timer 210 may expire. In some embodiments, in response to a determination that master inactivity timer 210 has expired, communications component 206 may be operative to initiate an RRC state management handshake with SeNB 250 by sending an inactivity notification message 212 to SeNB 250. In various embodiments, communications component 206 may be operative to send inactivity notification message 212 to SeNB 250 over X2 interface connection 245. The embodiments are not limited in this context.

In some embodiments, in response to receipt of inactivity notification message 212, SeNB 250 may be operative to determine a small cell activity status for dually-connected UE 260. In various embodiments, the small cell activity status for dually-connected UE 260 may generally indicate whether dually-connected UE 260 is to be regarded as being engaged in data communications with SeNB 250. In some embodiments, SeNB 250 may be operative to determine the small cell activity status for dually-connected UE 260 based on whether there is ongoing data packet activity between dually-connected UE 260 and SeNB 250. In various embodiments, if there is ongoing data packet activity between dually-connected UE 260 and SeNB 250, SeNB 250 may be operative to determine that the small cell activity status for dually-connected UE 260 comprises an active status. In some embodiments, if there is no ongoing data packet activity between dually-connected UE 260 and SeNB 250, SeNB 250 may be operative to determine that the small cell activity status for dually-connected UE 260 comprises an inactive status.

In various other embodiments, SeNB 250 may be operative to determine the small cell activity status for dually-connected UE 260 based on a secondary inactivity timer 214 that it maintains for dually-connected UE 260. In some embodiments, secondary inactivity timer 214 may comprise an RRC_Inactivity_Timer. In various embodiments, secondary inactivity timer 214 may generally indicate whether dually-connected UE 260 and SeNB 250 have exchanged data packets recently enough that dually-connected UE 260 is to be regarded as being engaged in data communications with SeNB 250. In some embodiments, when secondary inactivity timer 214 is running, dually-connected UE 260 may be regarded as being engaged in data communications with SeNB 250. In various embodiments, when secondary inactivity timer 214 has expired, dually-connected UE 260 may be regarded as not being engaged in data communications with SeNB 250. In some embodiments, SeNB 250 may be operative to reset secondary inactivity timer 214 each time that dually-connected UE 260 exchanges data packets with SeNB 250. In various embodiments, if secondary inactivity timer 214 is running, SeNB 250 may be operative to determine that the small cell activity status for dually-connected UE 260 comprises an active status. In some embodiments, if secondary inactivity timer 214 is expired, SeNB 250 may be operative to determine that the small cell activity status for dually-connected UE 260 comprises an inactive status. The embodiments are not limited in this context.

In various embodiments, SeNB 250 may send a state decision message 216 to apparatus 200 and/or system 240 that indicates whether dually-connected UE 260 may be transitioned to the RRC_Idle state. In some embodiments, if it has determined that the small cell activity status for dually-connected UE 260 comprises an active status, SeNB 250 may send a state decision message 216 indicating that dually-connected UE 260 may not be transitioned to the RRC_Idle state. In various embodiments, if it has determined that the small cell activity status for dually-connected UE 260 comprises an inactive status, SeNB 250 may send a state decision message 216 indicating that dually-connected UE 260 may be transitioned to the RRC_Idle state. The embodiments are not limited in this context.

In some embodiments, communication component 206 may be operative to receive state decision message 216 from SeNB 250 over X2 interface connection 245. In various embodiments, management component 208 may be operative to determine whether to transition dually-connected UE 260 to the RRC_Idle state based on state decision message 216. In some embodiments, in response to a determination that state decision message 216 indicates that dually-connected UE 260 may be transitioned to the RRC_Idle state, management component 208 may be operative to initiate a state transition procedure to transition dually-connected UE 260 to the RRC_Idle state. In various embodiments, in conjunction with the state transition procedure, communication component 206 may be operative to send a state notification message 218 to SeNB 250. In some embodiments, the state notification message 218 may indicate that dually-connected UE 260 is being transitioned to the RRC_Idle state and that the wireless data connection 265 between dually-connected UE 260 and SeNB 250 is to be released. In various embodiments, communication component 206 may be operative to send state notification message 218 to SeNB 250 over X2 interface connection 245. In some embodiments, in conjunction with the state transition procedure, communication component 206 may be operative to send a connection release command 220 to dually-connected UE 260. In various embodiments, connection release command 220 may notify dually-connected UE 260 that its wireless data connections 255 and 265 are to be released and that it is to enter the RRC_Idle state. In some embodiments, dually-connected UE 260 may enter the RRC_Idle state in response to receipt of connection release command 220. The embodiments are not limited in this context.

In various embodiments, in response to a determination that state decision message 216 indicates that dually-connected UE 260 may not be transitioned to the RRC_Idle state, management component 208 may be operative to maintain dually-connected UE 260 in the RRC_Connected state. In some embodiments, management component 208 may be operative to maintain dually-connected UE 260 in the RRC_Connected state on a provisional basis, pending the cessation of data activity between dually-connected UE 260 and SeNB 250 and/or the expiration of secondary inactivity timer 214 at SeNB 250. Herein, the term "provisional connected state" shall be employed to denote a connected state—such as an RRC_Connected state—in which a dually-connected UE is provisionally maintained, pending the cessation of data activity between the dually-connected UE and an SeNB and/or the expiration of a secondary inactivity timer for the UE at the SeNB. In various embodiments, while maintaining dually-connected UE 260 in a provisional connected state, communications component 206 may be operative to receive an inactivity notification message 222 from SeNB 250. In some embodiments, inactivity notification message 222 may generally inform apparatus 200 and/or system 240 that the small cell activity status of dually-connected UE 260 comprises an inactive status, and/or that dually-connected UE 260 may be transitioned to the RRC_Idle state. In various embodiments, inactivity notification message 222 may indicate that data activity between dually-connected UE 260 and SeNB 250 has ceased and/or that secondary inactivity timer 214 has expired. In some embodiments, communications component 206 may be operative to receive inactivity notification message 222 from SeNB 250 over X2 interface connection 245. In various embodiments, inactivity notification message 222 may comprise a message of a same type and/or format as state decision message 216. In some other embodiments, inactivity notification message 222 may comprise a different type of message that state decision message 216, and/or may comprise a different format than state decision message 216. The embodiments are not limited in this context.

In various embodiments, based on receipt of the inactivity notification message 222, management component 208 may be operative to determine whether to maintain dually-connected UE 260 in the RRC_Connected state or to transition dually-connected UE 260 to the RRC_Idle state based on the state of master inactivity timer 210. In some embodiments, if master inactivity timer 210 is running, management component 208 may determine to maintain dually-connected UE 260 in the RRC_Connected state. In various embodiments, if master inactivity timer 210 is expired, management component 208 may determine to transition dually-connected UE 260 to the RRC_Idle state. In some embodiments, communications component 206 may be operative to send a state notification message 224 to SeNB 250 in response to the inactivity notification message 222. In various embodiments, communications component 206 may be operative to send the state notification message 224 to SeNB 250 over X2 interface connection 245. In some embodiments, the state notification message 224 may notify SeNB 250 of the RRC state that management component 208 has selected for dually-connected UE 260. In various embodiments, if management component 208 has determined to transition dually-connected UE 260 to the RRC_Idle state, communications component 206 may be operative to send connection release command 220 to dually-connected UE 260. The embodiments are not limited in this context.

In some other embodiments, rather than maintaining dually-connected UE 260 in a provisional connected state in response to a determination that state decision message 216 indicates that dually-connected UE 260 may not be transitioned to the RRC_Idle state, management component 208 may be operative to simply reset master inactivity timer 210, and the RRC state management handshake may end. In various embodiments, master inactivity timer 210 may once again expire at a subsequent point in time, at which point management component 208 may be operative to initiate a new RRC state management handshake with SeNB 250. The embodiments are not limited in this context.

In some embodiments, X2 interface connection 245 may be implemented using a non-ideal backhaul, and there may be a non-ideal backhaul latency associated with the communication of messages over X2 interface connection 245. In various embodiments, since both inactivity notification message 212 and state decision message 216 are communicated over X2 interface connection 245, both inactivity notification message 212 and state decision message 216 may be subject to the non-ideal backhaul latency. In some embodiments, the non-ideal backhaul latency may result in a cumulative delay comprising an X2 round trip time of X2_RTT with respect to the receipt by apparatus 200 and/or system 240 of state decision message 216 in response to inactivity notification message 212. In various embodiments, X2_RTT may comprise a value on the order of tens of milliseconds. However, the embodiments are not limited in this context.

In some embodiments, at a time $T_1$ at which master inactivity timer 210 expires and communications component 206 sends inactivity notification message 212, dually-connected UE 260 may not be using either of its wireless data connections 255 and 265, and it may be appropriate that dually-connected UE 260 enter the RRC_Idle state. In various embodiments, due to the non-ideal backhaul latency and not accounting for any possible additional latencies, communications component 206 may not actually be able to send the connection release command 220 to instruct dually-connected UE 260 to enter the RRC_Idle state until a time $T_2=T_1+X2\_RTT$. In some embodiments, during this latency period lasting from time $T_1$ to time $T_2$, dually-connected UE 260 may remain in the RRC_Connected state. In various embodiments, operation in the RRC_Connected state may consume more power than operation in the RRC_Idle state, and this additional power consumption during the latency period may amount to waste if dually-connected UE 260 has no need to communicate data and ultimately enters the RRC_Idle state at time $T_2$.

As such, in some embodiments, rather than waiting until master inactivity timer 210 expires to send inactivity notification message 212, communications component 206 may be operative to send inactivity notification message 212 in advance of a prospective expiration of master inactivity timer 210. In various embodiments, for example, communications component 206 may be operative to send inactivity notification message 212 X2_RTT ms in advance of prospective expiration of master inactivity timer 210 at time $T_1$, at a time $T_0=T_1-X2\_RTT$. In some embodiments, communications component 206 may then receive state decision message 216 from SeNB 250 at, or approximately at, the same time $T_1$ as that at which master inactivity timer 210 expires, and wasteful power consumption between time $T_1$ and time $T_2$ may be avoided. In various embodiments, at some point prior to the time $T_0$, apparatus 200 and/or system 240 may measure X2_RTT using a ping message exchange with SeNB 250. It is worthy of note that if dually-connected UE 260 exchanges data packets with apparatus 200 and/or system 240 at some point between times $T_0$ and $T_1$, master inactivity timer 210 may be reset and thus may not actually expire at time $T_1$. In such an event, apparatus 200 and/or system 240 may simply ignore state decision message 216 and maintain dually-connected UE 260 in the RRC_Connected state. The embodiments are not limited in this context.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 3:
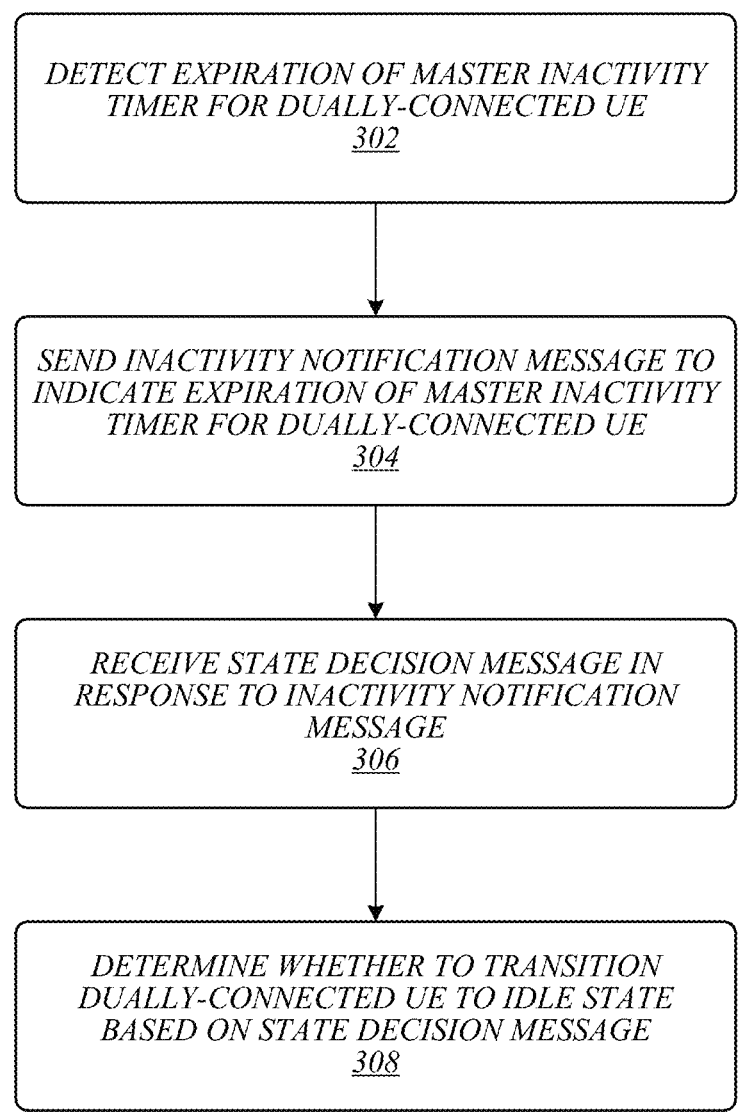
FIG. 3 illustrates an embodiment of a first logic flow.

FIG. 3 illustrates an embodiment of a logic flow 300, which may be representative of operations performed in some embodiments described herein. For example, logic flow 300 may be representative of operations that may be performed in various embodiments by apparatus 200 and/or system 240 of FIG. 2. As shown in logic flow 300, an expiration of a master inactivity timer for a dually-connected UE may be detected at 302. For example, management component 208 of FIG. 2 may be operative to detect an expiration of a master inactivity timer 210 for dually-connected UE 260. At 304, an inactivity notification message may be sent to indicate the expiration of the master inactivity timer for the dually-connected UE. For example, communications component 206 of FIG. 2 may be operative to send an inactivity notification message 212 to SeNB 250 to indicate an expiration of the master inactivity timer 210 for dually-connected UE 260. At 306, a state decision message may be received in response to the inactivity notification message. For example, communications component 206 of FIG. 2 may be operative to receive a state decision message 216 from SeNB 250 in response to the inactivity notification message 212. At 308, based on the state decision message, it may be determined whether to transition the dually-connected UE to an idle state. For example, management component 208 of FIG. 2 may be operative to determine whether to transition dually-connected UE 260 to an RRC_Idle state based on the state decision message 216. It is worthy of note that in some embodiments, rather than being sent following a determination at 302 that the master inactivity timer has expired, the inactivity notification message sent at 304 may be sent in advance of a prospective expiration of the master inactivity timer. In such embodiments, the expiration detected at 302 and indicated by the inactivity notification message sent at 304 may comprise a prospective expiration of the master inactivity timer. The embodiments are not limited in this context.

Figure 4:
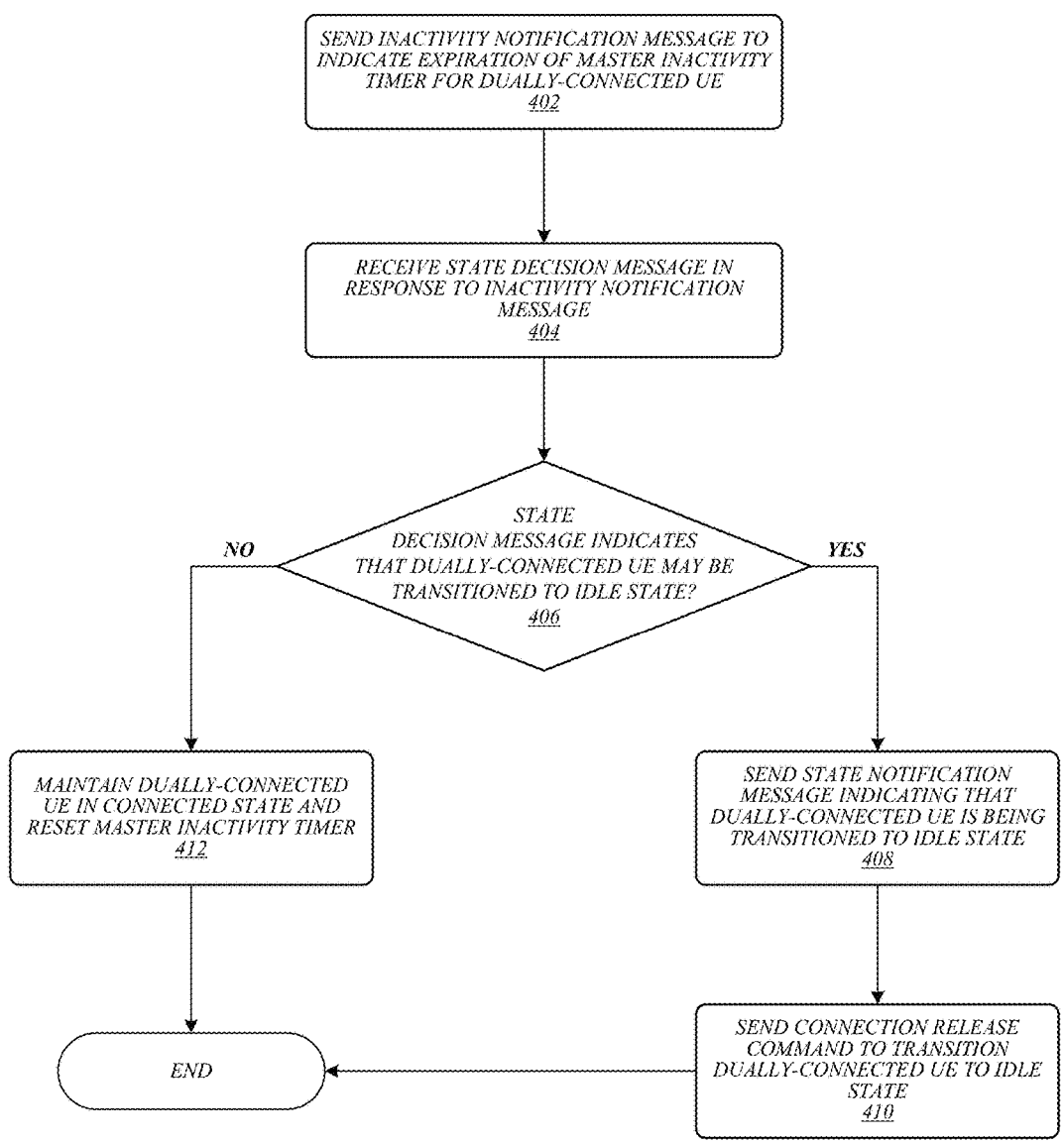
FIG. 4 illustrates an embodiment of a second logic flow.

FIG. 4 illustrates an embodiment of a logic flow 400, which may be representative of operations performed in some embodiments described herein. For example, logic flow 400 may be representative of operations that may be performed in various embodiments by apparatus 200 and/or system 240 of FIG. 2. As shown in logic flow 400, an inactivity notification message may be sent at 402 to indicate an expiration of a master inactivity timer for a dually-connected UE. For example, communications component 206 of FIG. 2 may be operative to send an inactivity notification message 212 to SeNB 250 to indicate an expiration of a master inactivity timer 210 for dually-connected UE 260. In some embodiments, the inactivity notification message may indicate a master inactivity timer expiration that has already occurred at the time that the inactivity notification message is sent. In various other embodiments, the inactivity notification message may indicate a prospective master inactivity timer expiration that has not yet occurred at the time that the inactivity notification message is sent. At 404, a state decision message may be received in response to the inactivity notification message. For example, communications component 206 of FIG. 2 may be operative to receive a state decision message 216 from SeNB 250 in response to the inactivity notification message 212. At 406, it may be determined whether the state decision message indicates that the dually-connected UE may be transitioned to an idle state. For example, management component 208 of FIG. 2 may be operative to determine whether the state decision message 216 indicates that the dually-connected UE 260 may be transitioned to an RRC_Idle state.

If it is determined at 406 that the state decision message indicates that the dually-connected UE may be transitioned to the idle state, flow may pass to 408. At 408, a state notification message may be sent that indicates that the dually-connected UE is being transitioned to the idle state. For example, communications component 206 of FIG. 2 may be operative to send a state notification message 218 to SeNB 250 that indicates that dually-connected UE 260 is being transitioned to the RRC_Idle state. From 408, flow may pass to 410, where a connection release command may be sent to transition the dually-connected UE to the idle state. For example, communications component 206 of FIG. 2 may be operative to send a connection release command 220 to transition dually-connected UE 260 to the RRC_Idle state. Following 410, the logic flow may end. It is worthy of note that although the operations at 410 are depicted as following those at 408 in the example of FIG. 4, the embodiments are not limited to this example. In some embodiments, the operations at 410 may be performed prior to those at 408. In various other embodiments, performance of the respective operations at 408 and 410 may be partially or entirely concurrent. If it is determined at 406 that the state decision message indicates that the dually-connected UE may not be transitioned to the idle state, flow may pass to 412. At 412, the dually-connected UE may be maintained in a connected state and the master inactivity timer may be reset. For example, management component 208 of FIG. 2 may be operative to maintain dually-connected UE 260 in an RRC_Connected state and reset master inactivity timer 210. Following 412, the logic flow may end. The embodiments are not limited to the aforementioned examples.

Figure 5:
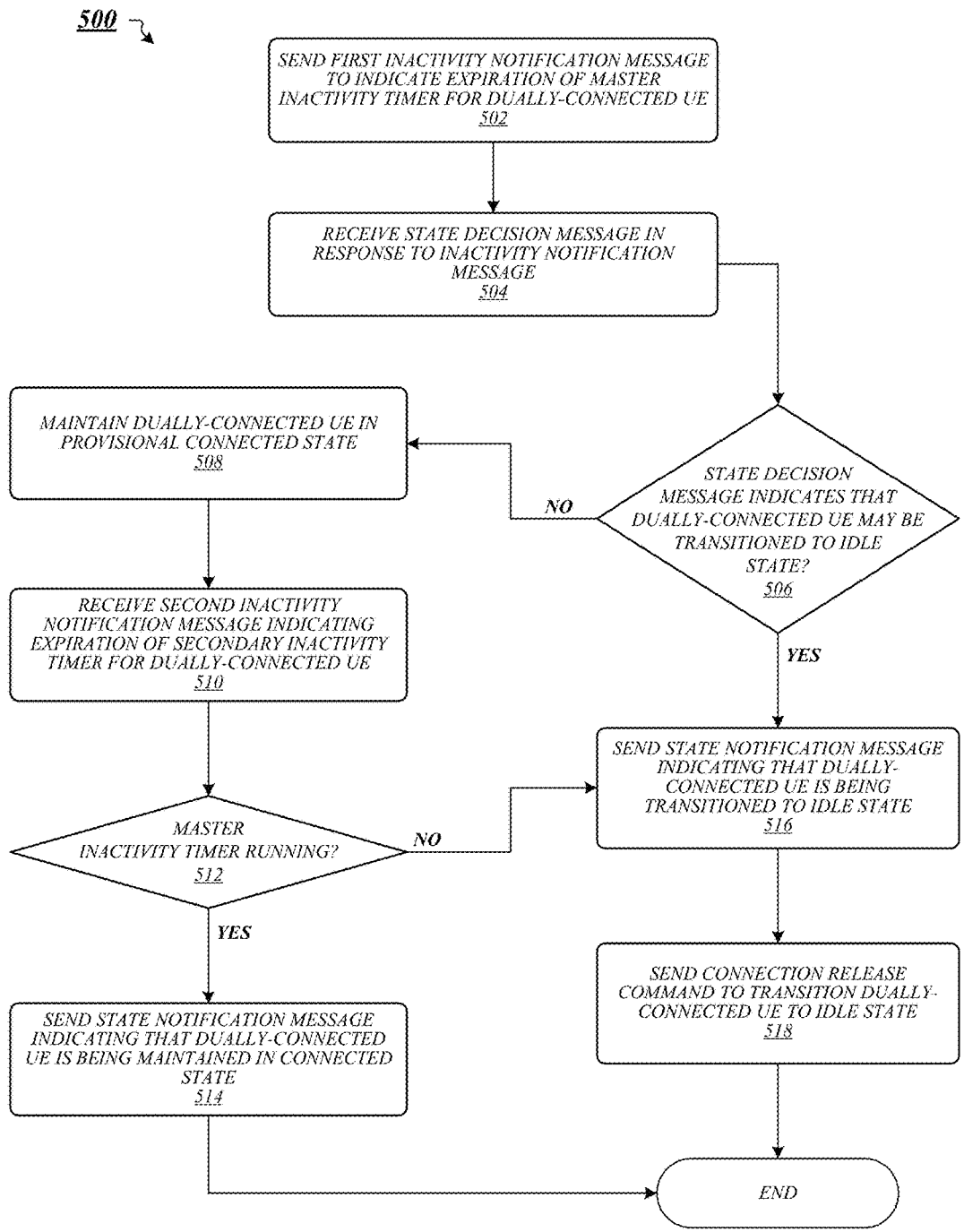
FIG. 5 illustrates an embodiment of a third logic flow.

FIG. 5 illustrates an embodiment of a logic flow 500, which may be representative of operations performed in some embodiments described herein. For example, logic flow 500 may be representative of operations that may be performed in various embodiments by apparatus 200 and/or system 240 of FIG. 2. As shown in logic flow 500, a first inactivity notification message may be sent at 502 to indicate an expiration of a master inactivity timer for a dually-connected UE. For example, communications component 206 of FIG. 2 may be operative to send an inactivity notification message 212 to SeNB 250 to indicate an expiration of a master inactivity timer 210 for dually-connected UE 260. In some embodiments, the inactivity notification message may indicate a master inactivity timer expiration that has already occurred at the time that the inactivity notification message is sent. In various other embodiments, the inactivity notification message may indicate a prospective master inactivity timer expiration that has not yet occurred at the time that the inactivity notification message is sent. At 504, a state decision message may be received in response to the inactivity notification message. For example, communications component 206 of FIG. 2 may be operative to receive a state decision message 216 from SeNB 250 in response to the inactivity notification message 212. At 506, it may be determined whether the state decision message indicates that the dually-connected UE may be transitioned to an idle state. For example, management component 208 of FIG. 2 may be operative to determine whether the state decision message 216 indicates that the dually-connected UE 260 may be transitioned to an RRC_Idle state.

If it is determined at 506 that the state decision message indicates that the dually-connected UE may be transitioned to the idle state, flow may pass to 516. At 516, a state notification message may be sent that indicates that the dually-connected UE is being transitioned to the idle state. For example, communications component 206 of FIG. 2 may be operative to send a state notification message 218 to SeNB 250 that indicates that dually-connected UE 260 is being transitioned to the RRC_Idle state. From 516, flow may pass to 518, where a connection release command may be sent to transition the dually-connected UE to the idle state. For example, communications component 206 of FIG. 2 may be operative to send a connection release command 220 to transition dually-connected UE 260 to the RRC_Idle state. Following 518, the logic flow may end. It is worthy of note that although the operations at 518 are depicted as following those at 516 in the example of FIG. 5, the embodiments are not limited to this example. In some embodiments, the operations at 518 may be performed prior to those at 516. In various other embodiments, performance of the respective operations at 516 and 518 may be partially or entirely concurrent. The embodiments are not limited in this context.

If it is determined at 506 that the state decision message indicates that the dually-connected UE may not be transitioned to the idle state, flow may pass to 508. At 508, the dually-connected UE may be maintained in a provisional connected state. For example, management component 208 of FIG. 2 may be operative to maintain the dually-connected UE 260 in a provisional RRC_Connected state. Following 508, a second inactivity notification message may be received at 510 that indicates an expiration of a secondary inactivity timer for the dually-connected UE. For example, communications component 206 of FIG. 2 may be operative to receive an inactivity notification message 222 from SeNB 250 that indicates an expiration of secondary inactivity timer 214. In response to receipt of the second inactivity notification message at 510, a determination of whether the master inactivity timer is running or expired may be performed at 512. For example, management component 208 of FIG. 2 may be operative to determine whether master inactivity timer 210 is running or is expired. If it is determined at 512 that the master inactivity timer is expired, flow may pass to block 516, which is discussed above. If it is determined at 512 that the master inactivity timer is running, flow may pass to 514. At 514, a state notification message may be sent that indicates that the dually-connected UE is being maintained in a connected state. For example, communications component 206 of FIG. 2 may be operative to send a state notification message 224 to SeNB 250 that indicates that dually-connected UE 260 is being maintained in an RRC_Connected state. Following 514, the logic flow may end. The embodiments are not limited to the aforementioned examples.

Figure 6:
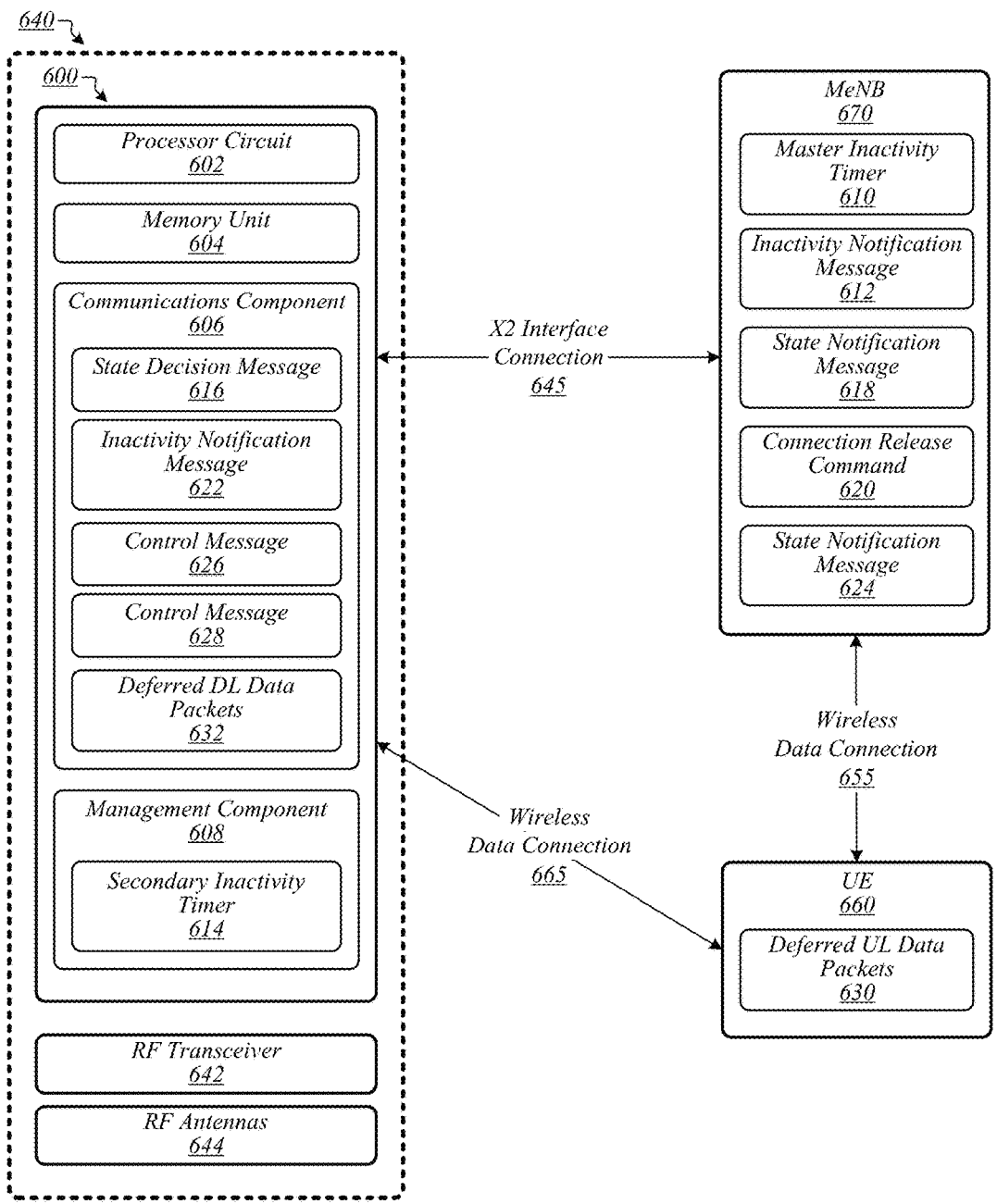
FIG. 6 illustrates an embodiment of a second apparatus and an embodiment of a second system.

FIG. 6 illustrates a block diagram of an apparatus 600. Apparatus 600 may be representative of an SeNB that may implement coordination techniques for RRC state management in dual-connectivity architectures in some embodiments. For example, apparatus 600 may be representative of SeNB 104 of FIG. 1 and/or SeNB 250 of FIG. 2. As shown in FIG. 6, apparatus 600 comprises multiple elements including a processor circuit 602, a memory unit 604, a communications component 606, and a management component 608. The embodiments, however, are not limited to the type, number, or arrangement of elements shown in this figure.

In various embodiments, apparatus 600 may comprise processor circuit 602. Processor circuit 602 may be implemented using any processor or logic device, and may be the same as or similar to processor circuit 202 of FIG. 2. The embodiments are not limited in this context.

In some embodiments, apparatus 600 may comprise or be arranged to communicatively couple with a memory unit 604. Memory unit 604 may be implemented using any machine-readable or computer-readable media capable of storing data, including both volatile and non-volatile memory, and may be the same as or similar to memory unit 204 of FIG. 2. The embodiments are not limited in this context.

In various embodiments, apparatus 600 may comprise a communications component 606. Communications component 606 may comprise logic, circuitry, and/or instructions operative to send messages to one or more remote devices and/or to receive messages from one or more remote devices. In some embodiments, communications component 606 may be operative to send and/or receive messages over one or more wired connections, one or more wireless connections, or a combination of both. In various embodiments, communications component 606 may additionally comprise logic, circuitry, and/or instructions operative to perform various operations in support of such communications. Examples of such operations may include selection of transmission and/or reception parameters and/or timing, packet and/or protocol data unit (PDU) construction and/or deconstruction, encoding and/or decoding, error detection, and/or error correction. The embodiments are not limited to these examples.

In some embodiments, apparatus 600 may comprise a management component 608. Management component 608 may comprise logic, circuitry, and/or instructions operative to track and/or manage the connectivity states and/or communication activities of one or more UEs or other mobile devices. In various embodiments, management component 608 may be configured to perform various determinations, decisions, selections, operations, and/or actions in conjunction with such tracking and/or management. In some embodiments, management component 608 may be configured to perform various determinations, decisions, selections, operations, and/or actions in support of coordination with an external control node such as an MeNB with regard to RRC state management for one or more dually-connected UEs. The embodiments are not limited in this context.

FIG. 6 also illustrates a block diagram of a system 640. System 640 may comprise any of the aforementioned elements of apparatus 600. System 640 may further comprise an RF transceiver 642. RF transceiver 642 may comprise one or more radios capable of transmitting and receiving signals using various suitable wireless communications techniques. Such techniques may involve communications across one or more wireless networks. Exemplary wireless networks may include, without limitation, any of the examples previously mentioned with respect to RF transceiver 244 of FIG. 2. In communicating across such networks, RF transceiver 642 may operate in accordance with one or more applicable standards in any version. The embodiments are not limited in this context.

In various embodiments, system 640 may comprise one or more RF antennas 644. Examples of any particular RF antenna 644 may include, without limitation, any of the examples previously mentioned with respect to RF antenna(s) 244 of FIG. 2. In some embodiments, RF transceiver 642 may be operative to send and/or receive messages and/or data using one or more RF antennas 644. The embodiments are not limited in this context.

During general operation, apparatus 600 and/or system 640 may be operative to provide wireless service within a small cell such as small cell 110 of FIG. 1. In various embodiments, apparatus 600 and/or system 640 may be operative to provide wireless service within a small cell located within an overlaid macro cell, such as macro cell 108 of FIG. 1. In some embodiments, apparatus 600 and/or system 640 may be operative to communicate with an MeNB 670 that serves a macro cell overlaid upon the small cell served by apparatus 600 and/or system 640. In various embodiments, MeNB 670 may be the same as or similar to apparatus 200 and/or system 240 of FIG. 2. In some embodiments, apparatus 600 and/or system 640 may be operative to communicate with MeNB 670 via an X2 interface connection 645. In various embodiments, X2 interface connection 645 may be the same as or similar to X2 interface connection 245 of FIG. 2. In some embodiments, the X2 interface connection 645 may be implemented using a non-ideal backhaul connection between apparatus 600 and/or system 640 and MeNB 670, such as non-ideal backhaul 106 of FIG. 1. The embodiments are not limited in this context.

In various embodiments, a dually-connected UE 660 may possess concurrent data connectivity with apparatus 600 and/or system 640 and MeNB 670. In some embodiments, the dually-connected UE 660 may possess data connectivity with MeNB 670 via a wireless data connection 655 and may possess data connectivity with apparatus 600 and/or system 640 via a wireless data connection 665. In various embodiments, wireless data connections 655 and 665 may utilize different wireless communication frequencies. In some embodiments, dually-connected UE 660 may be configured to observe a same RRC state with respect to apparatus 600 and/or system 640 as it does with respect to MeNB 670. In various embodiments, dually-connected UE 660 may be configured either to observe an RRC_Connected state with respect to both MeNB 670 and apparatus 600 and/or system 640 or to observe an RRC_Idle state with respect to both MeNB 670 and apparatus 600 and/or system 640. In some embodiments, while in the dual-connectivity mode of operation, dually-connected UE 660 may observe an RRC_Connected state with respect to both MeNB 670 and apparatus 600 and/or system 640. In various embodiments, MeNB 670 may be responsible for sending RRC messages to dually-connected UE 660 in order to provide dually-connected UE 660 with any desired instructions regarding its RRC state. In some embodiments, apparatus 600 and/or system 640 may not be configured with the ability to send RRC messages to UEs, and thus may be unable to send RRC messages to dually-connected UE 660. The embodiments are not limited in this context.

In various embodiments, it may be desirable that dually-connected UE 660 be transitioned to the RRC_Idle state if it is neither engaging in data communications with apparatus 600 and/or system 640 nor engaging in data communications with MeNB 670. In some embodiments, it may be desirable that dually-connected UE 660 be maintained in the RRC- _Connected state if it is engaging in data communications with apparatus 600 and/or system 640, engaging in data communications with MeNB 670, or both. In various embodiments, apparatus 600 and/or system 640 may not be configured with the ability to send RRC messages to dually-connected UE 660, and thus MeNB 670 may be tasked with instructing dually-connected UE 660 to enter the RRC_Idle state if dually-connected UE 660 is neither engaging in data communications with apparatus 600 and/or system 640 nor engaging in data communications with MeNB 670. In some embodiments, MeNB 670 may be configured to use an RRC state management handshake to coordinate with apparatus 600 and/or system 640 in conjunction with determining whether to transition dually-connected UE 660 to the RRC_Idle state. In various embodiments, in conjunction with the RRC state management handshake, apparatus 600 and/or system 640 may generally be operative to provide MeNB 670 with information indicating whether dually-connected UE 660 is engaging in data communications with apparatus 600 and/or system 640. The embodiments are not limited in this context.

In some embodiments, MeNB 670 may be operative to maintain a master inactivity timer 610 for dually-connected UE 660. In various embodiments, master inactivity timer 610 may comprise an RRC_Inactivity_Timer. In some embodiments, master inactivity timer 610 may generally indicate whether dually-connected UE 660 and MeNB 670 have exchanged data packets recently enough that dually-connected UE 660 is to be regarded as being engaged in data communications with MeNB 670. In various embodiments, when master inactivity timer 610 is running, dually-connected UE 660 may be regarded as being engaged in data communications with MeNB 670. In some embodiments, when master inactivity timer 610 has expired, dually-connected UE 660 may be regarded as not being engaged in data communications with MeNB 670. In various embodiments, MeNB 670 may be operative to reset master inactivity timer 610 each time that dually-connected UE 660 exchanges data packets with MeNB 670. The embodiments are not limited in this context.

In some embodiments, following a time interval during which no data packets are exchanged between dually-connected UE 660 and MeNB 670, master inactivity timer 610 may expire. In various embodiments, in response to expiration—or approaching expiration—of master inactivity timer 610, MeNB 670 may be operative to initiate an RRC state management handshake with apparatus 600 and/or system 640. In some embodiments, MeNB 670 may be operative to initiate the RRC state management handshake with apparatus 600 and/or system 640 by sending an inactivity notification message 612 to apparatus 600 and/or system 640. In various embodiments, the inactivity notification message 612 may indicate an expiration of master inactivity timer 610. In some embodiments, MeNB 670 may be operative to send the inactivity notification message 612 after the expiration of master inactivity timer 610 has occurred. In various other embodiments, MeNB 670 may be operative to send the inactivity notification message 612 in advance of a prospective expiration of master inactivity timer 610. In some embodiments, communications component 606 may be operative to receive inactivity notification message 612 from MeNB 670 over X2 interface connection 645. The embodiments are not limited in this context.

In various embodiments, in response to receipt of inactivity notification message 612, management component 608 may be operative to determine a small cell activity status for dually-connected UE 660. In some embodiments, the small cell activity status for dually-connected UE 660 may generally indicate whether dually-connected UE 660 is to be regarded as being engaged in data communications with apparatus 600 and/or system 640. In various embodiments, management component 608 may be operative to determine the small cell activity status for dually-connected UE 660 based on whether there is ongoing data packet activity between dually-connected UE 660 and apparatus 600 and/or system 640. In some embodiments, if there is ongoing data packet activity between dually-connected UE 660 and apparatus 600 and/or system 640, management component 608 may be operative to determine that the small cell activity status for dually-connected UE 660 comprises an active status. In various embodiments, if there is no ongoing data packet activity between dually-connected UE 660 and apparatus 600 and/or system 640, management component 608 may be operative to determine that the small cell activity status for dually-connected UE 660 comprises an inactive status.

In some embodiments, management component 608 may be operative to maintain a secondary inactivity timer 614 for dually-connected UE 660. In various embodiments, secondary inactivity timer 614 may comprise an RRC_Inactivity_Timer. In some embodiments, secondary inactivity timer 614 may generally indicate whether dually-connected UE 660 and apparatus 600 and/or system 640 have exchanged data packets recently enough that dually-connected UE 660 is to be regarded as being engaged in data communications with apparatus 600 and/or system 640. In various embodiments, when secondary inactivity timer 614 is running, dually-connected UE 660 may be regarded as being engaged in data communications with apparatus 600 and/or system 640. In some embodiments, when secondary inactivity timer 614 has expired, dually-connected UE 660 may be regarded as not being engaged in data communications with apparatus 600 and/or system 640. In various embodiments, management component 608 may be operative to reset secondary inactivity timer 614 each time that dually-connected UE 660 exchanges data packets with apparatus 600 and/or system 640. In some embodiments, if secondary inactivity timer 614 is running, management component 608 may be operative to determine that the small cell activity status for dually-connected UE 660 comprises an active status. In various embodiments, if secondary inactivity timer 614 is expired, management component 608 may be operative to determine that the small cell activity status for dually-connected UE 660 comprises an inactive status. The embodiments are not limited in this context.

In some embodiments, management component 608 may be operative to determine whether dually-connected UE 660 may be transitioned to the RRC_Idle state based on the small cell activity status for dually-connected UE 660. In various embodiments, in response to a determination that the small cell activity status for dually-connected UE 660 comprises an active status, management component 608 may be operative to determine that dually-connected UE 660 may not be transitioned to the RRC_Idle state. In some embodiments, in response to a determination that the small cell activity status for dually-connected UE 660 comprises an inactive status, management component 608 may be operative to determine that dually-connected UE 660 may be transitioned to the RRC_Idle state. In various embodiments, communications component 606 may be operative to send a state decision message 616 to MeNB 670 that indicates whether dually-connected UE 660 may be transitioned to the RRC_Idle state. In some embodiments, communications component 606 may be operative to send state decision message 616 to MeNB 670 over X2 interface connection 645. The embodiments are not limited in this context.

In various embodiments, in response to a determination by management component 608 that the small cell activity status for dually-connected UE 660 comprises an inactive status, communications component 606 may be operative to send a state decision message 616 to MeNB 670 that indicates that dually-connected UE 660 may be transitioned to the RRC_Idle state. In some embodiments, in response to the state decision message 616 indicating that dually-connected UE 660 may be transitioned to the idle state, MeNB 670 may be operative to initiate a state transition procedure to transition dually-connected UE 660 to the RRC_Idle state. In various embodiments, in conjunction with the state transition procedure, MeNB 670 may be operative to send a state notification message 618 to apparatus 600 and/or system 640 and send a connection release command 620 to dually-connected UE 660. In some embodiments, the state notification message 618 may indicate that dually-connected UE 660 is being transitioned to the RRC_Idle state and that the wireless data connection 665 between dually-connected UE 660 and apparatus 600 and/or system 640 is to be released. In various embodiments, communications component 606 may be operative to receive state notification message 618 from MeNB 670 over X2 interface connection 645. In some embodiments, connection release command 620 may notify dually-connected UE 660 that its wireless data connections 655 and 665 are to be released and that it is to enter the RRC_Idle state. In various embodiments, dually-connected UE 660 may enter the RRC_Idle state in response to receipt of connection release command 620. The embodiments are not limited in this context.

In some embodiments, due to non-ideal backhaul latency associated with X2 interface connection 645, there may be a significant latency period between the time at which communications component 606 sends a state decision message 616 indicating that dually-connected UE 660 may be transitioned to the RRC_Idle state and the time at which dually-connected UE 660 receives connection release command 620 and actually enters the RRC_Idle state. In various embodiments, if data communications are initiated between dually-connected UE 660 and apparatus 600 and/or system 640 during this latency period, they may be subsequently disrupted if MeNB 670 proceeds with transitioning dually-connected UE 660 to the RRC_Idle state. In some embodiments, in order to avoid or reduce unproductive power consumption and/or signaling overhead, apparatus 600 and/or system 640 may be configured to recognize an idle-pending condition for the dually-connected UE 660 during this latency period. In various embodiments, while dually-connected UE 660 is subject to the idle-pending condition, apparatus 600 and/or system 640 may defer sending any DL data packets that it may have for dually-connected UE 660. The embodiments are not limited in this context.

In some embodiments, communications component 606 may be operative to send a control message 626 to dually-connected UE 660 in order to inform dually-connected UE 660 that it is subject to the idle-pending condition. In various embodiments, in response to notification that it is subject to the idle-pending condition, dually-connected UE 660 may be operative to defer sending any UL data packets that it may have for apparatus 600 and/or system 640. In some embodiments, control message 626 may comprise a medium access control (MAC) control element (CE). In various such embodiments, control message 626 may comprise a novel MAC CE that is designated for use in informing dually-connected UEs that they are subject to idle-pending conditions. The embodiments are not limited in this context.

Figure 7:
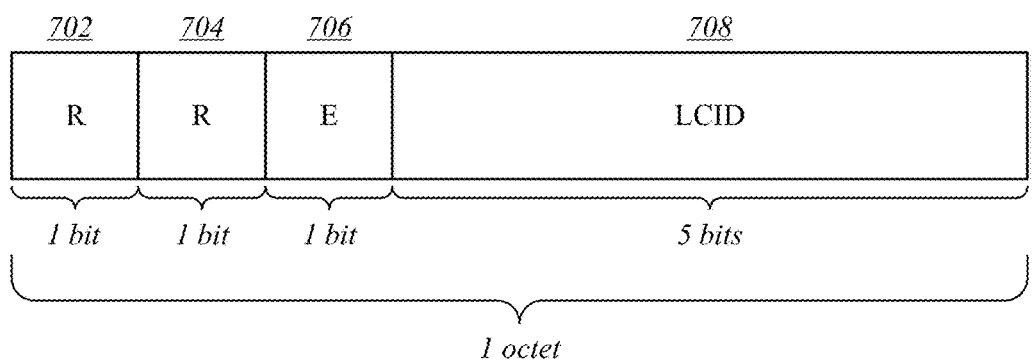
FIG. 7 illustrates an embodiment of a control message.

FIG. 7 illustrates a control message 700 such as may be representative of control message 600 of FIG. 6 in some embodiments. As shown in FIG. 7, control message 700 comprises fields 702, 704, 706, and 708. In the example of FIG. 7, fields 702, 704, and 706 each comprise one bit, field 708 comprises five bits, and control message 700 comprises a size of one octet. In various embodiments, fields 702 and 704 may comprise reserved bits that are both set to '0' values. In some embodiments, field 706 may comprise an extension field bit. In various embodiments, the extension field bit may comprise a bit set to a '0' value to indicate that no additional fields follow field 708. In some embodiments, field 708 may comprise a logical channel ID (LCID) value indicating that control message 700 comprises a notification associated with an idle-pending condition for a dually-connected UE. In various embodiments, field 708 may comprise an LCID value that is reserved according to a conventional wireless communication protocol. For example, in some embodiments, field 708 may comprise an LCID value from among the range "01011" to "11001" that is reserved according to 3GPP TS 36.321 ver. 12.1.0 (released March 2013), and/or according to any predecessors, revisions, progeny, and/or variants thereof. The embodiments are not limited in this context.

Returning to FIG. 6, in various embodiments, dually-connected UE 660 may begin deferring UL data communications with apparatus 600 and/or system 640 upon receipt of control message 626. In some embodiments, if communications component 606 does not receive a state notification message 618 from MeNB 670 that indicates that dually-connected UE 660 is being transitioned to the RRC_Idle state, management component 608 may be operative to determine that dually-connected UE 660 is being maintained in the RRC_Connected state. In various embodiments, management component 608 may be operative to determine that dually-connected UE 660 is being maintained in the RRC_Connected state if communications component 606 does not receive such a state notification message 618 within a defined time interval $T_{handshake}$. In some embodiments, in response to a determination that dually-connected UE 660 is being maintained in the RRC_Connected state, management component 608 may be operative to determine that dually-connected UE 660 is no longer subject to the idle-pending condition. In various embodiments, in response to a determination by management component 608 that dually-connected UE 660 is no longer subject to the idle-pending condition, communications component 606 may be operative to send a control message 628 to dually-connected UE 660 in order to inform dually-connected UE 660 that it is no longer subject to the idle-pending condition. In some embodiments, control message 628 may comprise a same MAC CE as control message 626. The embodiments are not limited in this context.

In various embodiments, in response to a determination by management component 608 that dually-connected UE 660 is no longer subject to the idle-pending condition, apparatus 600 and/or system 640 may be operative to exchange one or more deferred data packets with dually-connected UE 660. In some embodiments, in response to receipt of control message 628, dually-connected UE 660 may be operative to send one or more deferred UL data packets 630 to apparatus 600 and/or system 640. In various embodiments, communications component 606 may be operative to receive one or more deferred UL data packets 630 from dually-connected UE 660 over wireless data connection 665. In some embodiments, communications component 606 may additionally or alternatively be operative to send one or more deferred DL data packets 632 to dually-connected UE 660 over wireless data connection 665. The embodiments are not limited in this context.

In various embodiments, in response to receipt of inactivity notification message 612, management component 608 may be operative to determine that the small cell activity status for dually-connected UE 660 comprises an active status. In some embodiments, in response to such a determination, communications component 606 may be operative to send a state decision message 616 to MeNB 670 that indicates that dually-connected UE 660 may not be transitioned to the RRC_Idle state. In various embodiments, in response to the state decision message 616 indicating that dually-connected UE 660 may not be transitioned to the RRC_Idle state, MeNB 670 may be operative to maintain dually-connected UE 660 in the RRC_Connected state and reset master inactivity timer 610, and the RRC state management handshake may end. In some such embodiments, master inactivity timer 610 may once again expire—or approach expiration—at a subsequent point in time, at which point MeNB 670 may be operative to initiate a new RRC state management handshake with apparatus 600 and/or system 640. The embodiments are not limited in this context.

In various other embodiments, the RRC state management handshake may continue following receipt by MeNB 670 of a state decision message 616 that indicates that dually-connected UE 660 may not be transitioned to the RRC_Idle state. In some embodiments, if state decision message 616 indicates that dually-connected UE 660 may not be transitioned to the RRC_Idle state, MeNB 670 may be operative to maintain dually-connected UE 660 in a provisional connected state, pending a potential change of the small cell activity status of dually-connected UE 660 from an active status to an inactive status. In various embodiments, at a subsequent point in time, management component 608 may be operative to determine that the small cell activity status of dually-connected UE 660 has changed from the active status to the inactive status. In some embodiments, management component 608 may be operative to perform this determination in response to a determination that previously ongoing data activity between dually-connected UE 660 and apparatus 600 and/or system 640 has ceased, and/or that the previously running secondary inactivity timer 614 has expired. The embodiments are not limited in this context.

In various embodiments, in response to a determination by management component 608 that the small cell activity status of dually-connected UE 660 has changed to an inactive status, communications component 606 may be operative to send an inactivity notification message 622 to MeNB 670. In some embodiments, inactivity notification message 622 may generally inform MeNB 670 that the small cell activity status of dually-connected UE 660 comprises an inactive status, and/or that dually-connected UE 660 may be transitioned to the RRC_Idle state. In various embodiments, inactivity notification message 622 may indicate that data activity between dually-connected UE 660 and apparatus 600 and/or system 640 has ceased and/or that secondary inactivity timer 614 has expired. In some embodiments, communications component 606 may be operative to send inactivity notification message 622 to MeNB 670 over X2 interface connection 645. In various embodiments, inactivity notification message 622 may comprise a message of a same type and/or format as state decision message 616. In some other embodiments, inactivity notification message 622 may comprise a different type of message that state decision message 616, and/or may comprise a different format than state decision message 616. The embodiments are not limited in this context.

In various embodiments, based on receipt of the inactivity notification message 622, MeNB 670 may be operative to determine whether to maintain dually-connected UE 660 in the RRC_Connected state or to transition dually-connected UE 660 to the RRC_Idle state based on the state of master inactivity timer 610. In some embodiments, if master inactivity timer 610 is running, MeNB 670 may determine to maintain dually-connected UE 660 in the RRC_Connected state. In various embodiments, if master inactivity timer 610 is expired, MeNB 670 may determine to transition dually-connected UE 660 to the RRC_Idle state. In some embodiments, MeNB 670 may be operative to send a state notification message 624 to apparatus 600 and/or system 640 in response to the inactivity notification message 622. In various embodiments, communications component 606 may be operative to receive the state notification message 624 from MeNB 670 over X2 interface connection 645. In some embodiments, the state notification message 624 may notify apparatus 600 and/or system 640 of the RRC state that MeNB 670 has selected for dually-connected UE 660. In various embodiments, if MeNB 670 has determined to transition dually-connected UE 660 to the RRC_Idle state, MeNB 670 may be operative to send connection release command 620 to dually-connected UE 660. The embodiments are not limited in this context.

Due to non-ideal backhaul latency associated with X2 interface connection 645 in some embodiments, if MeNB 670 does opt to transition dually-connected UE 660 to the RRC_Idle state in response to inactivity notification message 622, there may be a significant latency period between the time at which communications component 606 sends inactivity notification message 622 and the time at which dually-connected UE 660 receives connection release command 620 and actually enters the RRC_Idle state. In various embodiments, management component 608 may therefore be operative to recognize an idle-pending condition for dually-connected UE 660 following transmission of inactivity notification message 622 to MeNB 670. In some embodiments, communications component 606 may be operative to send control message 626 to dually-connected UE 660 in order to inform dually-connected UE 660 that it is subject to the idle-pending condition. In various embodiments, in response to notification that it is subject to the idle-pending condition, dually-connected UE 660 may be operative to defer sending any UL data packets that it may have for apparatus 600 and/or system 640.

In some embodiments, dually-connected UE 660 may begin deferring UL data communications with apparatus 600 and/or system 640 upon receipt of control message 626. In various embodiments, if communications component 606 receives a state notification message 624 from MeNB 670 that indicates that dually-connected UE 660 is being transitioned to the RRC_Connected state or does not receive a response to inactivity notification message 622 from MeNB 670, management component 608 may be operative to determine that dually-connected UE 660 is being maintained in the RRC_Connected state. In some embodiments, management component 608 may be operative to determine that dually-connected UE 660 is being maintained in the RRC_Connected state if communications component 606 does not receive a response to inactivity notification message 622 within a defined time interval $T_{handshake}$. In various embodiments, in response to a determination that dually-connected UE 660 is being maintained in the RRC_Connected state, management component 608 may be operative to determine that dually-connected UE 660 is no longer subject to the idle-pending condition. In some embodiments, in response to a determination by management component 608 that dually-connected UE 660 is no longer subject to the idle-pending condition, communications component 606 may be operative to send a control message 628 to dually-connected UE 660 in order to inform dually-connected UE 660 that it is no longer subject to the idle-pending condition. In various embodiments, control message 628 may comprise a same MAC CE as control message 626. In some embodiments, in response to receipt of control message 628, dually-connected UE 660 may be operative to send one or more deferred UL data packets 630 to apparatus 600 and/or system 640. In various embodiments, communications component 606 may be operative to receive one or more deferred UL data packets 630 from dually-connected UE 660 over wireless data connection 665. The embodiments are not limited in this context.

Figure 8:
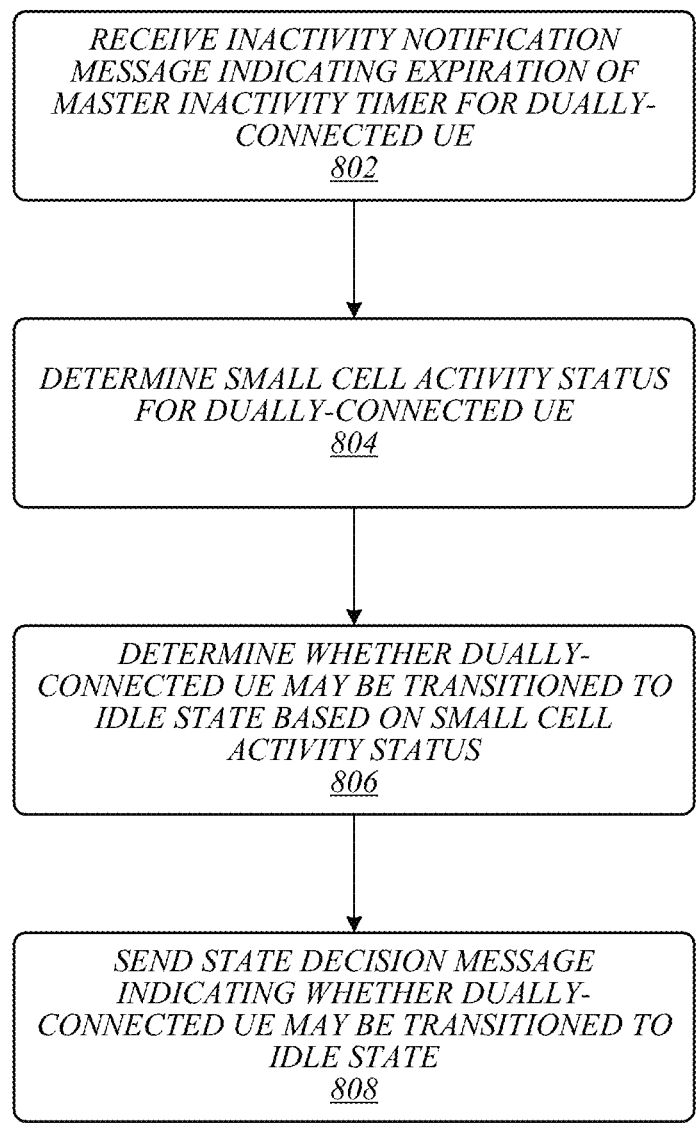
FIG. 8 illustrates an embodiment of a fourth logic flow.

FIG. 8 illustrates an embodiment of a logic flow 800, which may be representative of operations performed in some embodiments described herein. For example, logic flow 800 may be representative of operations that may be performed in various embodiments by apparatus 600 and/or system 640 of FIG. 6. As shown in logic flow 800, an inactivity notification message may be received at 802 that indicates an expiration of a master inactivity timer for a dually-connected UE. For example, communications component 606 of FIG. 6 may be operative to receive an inactivity notification message 612 from MeNB 670 that indicates an expiration of a master inactivity timer 610 for dually-connected UE 660. In some embodiments, the indicated master inactivity timer expiration may already have occurred at the time that the inactivity notification message was sent. In various other embodiments, the inactivity notification message may have been sent in advance of the indicated master inactivity timer expiration. At 804, a small cell activity status may be determined for the dually-connected UE. For example, management component 608 of FIG. 6 may be operative to determine a small cell activity status for dually-connected UE 660. At 806, based on the small cell activity status for the dually-connected UE, it may be determined whether the dually-connected UE may be transitioned to an idle state. For example, management component 608 of FIG. 6 may be operative to determine whether dually-connected UE 660 may be transitioned to an RRC_Idle state based on the small cell activity status for dually-connected UE 660. At 808, a state decision message may be sent that indicates whether the dually-connected UE may be transitioned to the idle state. For example, communications component 606 of FIG. 6 may be operative to send a state decision message 616 to MeNB 670 that indicates whether dually-connected UE 660 may be transitioned to the RRC_Idle state. The embodiments are not limited to these examples.

Figure 9:
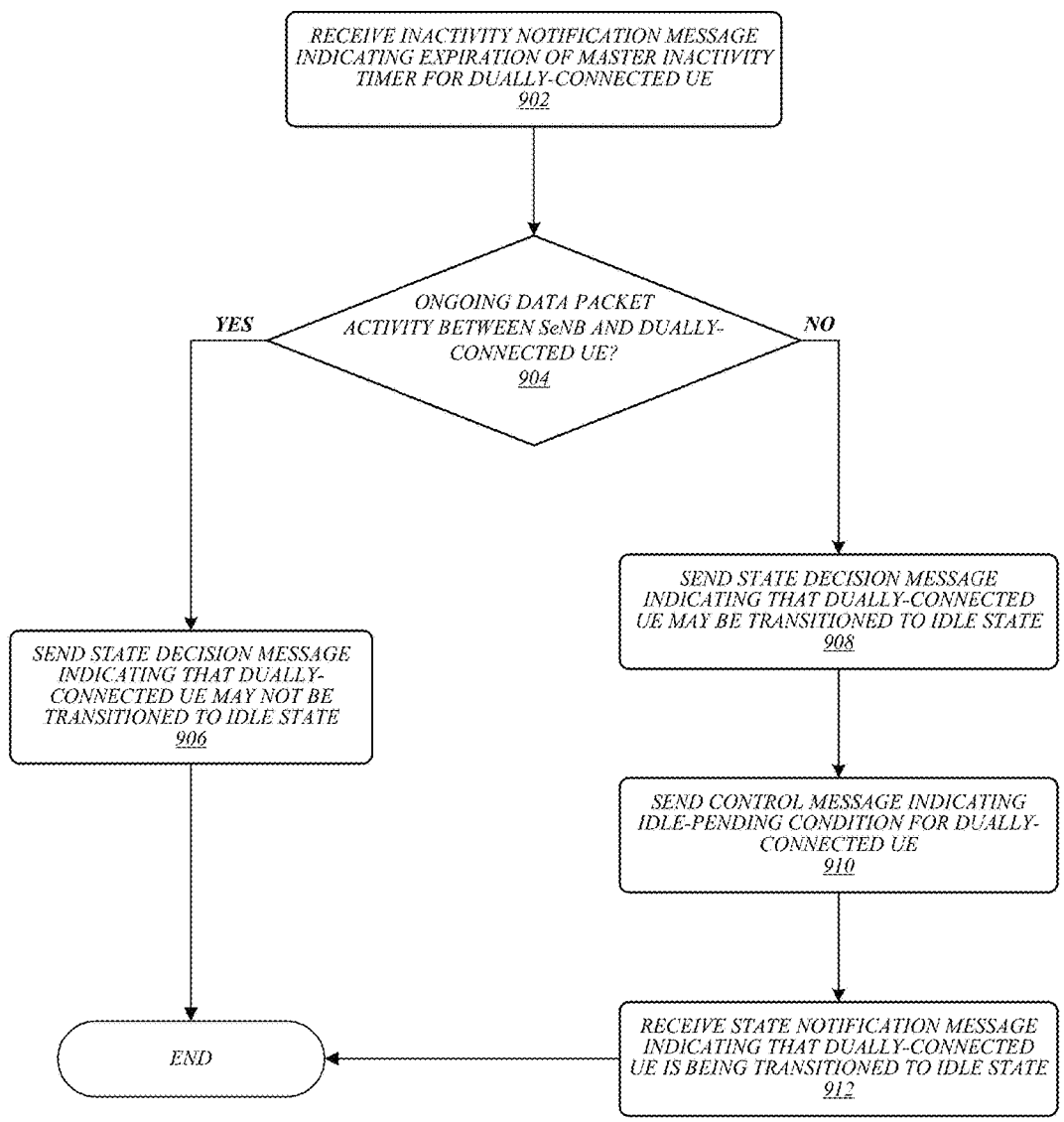
FIG. 9 illustrates an embodiment of a fifth logic flow.

FIG. 9 illustrates an embodiment of a logic flow 900, which may be representative of operations performed in some embodiments described herein. For example, logic flow 900 may be representative of operations that may be performed in various embodiments by apparatus 600 and/or system 640 of FIG. 6. More particularly, logic flow 900 may be representative of some embodiments in which apparatus 600 and/or system 640 of FIG. 6 determines the small cell activity status of dually-connected UE 660 based on whether there is ongoing data packet activity between dually-connected UE 660 and apparatus 600 and/or system 640.

As shown in logic flow 900, an inactivity notification message may be received at 902 that indicates an expiration of a master inactivity timer for a dually-connected UE. For example, communications component 606 of FIG. 6 may be operative to receive an inactivity notification message 612 from MeNB 670 that indicates an expiration of a master inactivity timer 610 for dually-connected UE 660. In some embodiments, the indicated master inactivity timer expiration may already have occurred at the time that the inactivity notification message was sent. In various other embodiments, the inactivity notification message may have been sent in advance of the indicated master inactivity timer expiration. At 904, a determination may be performed of whether there is ongoing data packet activity between an SeNB and the dually-connected UE. For example, management component 608 of FIG. 6 may be operative to determine whether there is ongoing data packet activity between apparatus 600 and/or system 640 and dually-connected UE 660. If it is determined at 904 that there is ongoing data packet activity between the SeNB and the dually-connected UE, flow may pass to 906. At 906, a state decision message may be sent that indicates that the dually-connected UE may not be transitioned to an idle state. For example, communications component 606 of FIG. 6 may be operative to send a state decision message 616 to MeNB 670 that indicates that dually-connected UE 660 may not be transitioned to an RRC_Idle state. Following 906, the logic flow may end.

If it is determined at 904 that there is no ongoing data packet activity between the SeNB and the dually-connected UE, flow may pass to 908. At 908, a state decision message may be sent that indicates that the dually-connected UE may be transitioned to an idle state. For example, communications component 606 of FIG. 6 may be operative to send a state decision message 616 to MeNB 670 that indicates that dually-connected UE 660 may be transitioned to an RRC_Idle state. From 908, flow may pass to 910, where a control message may be sent that indicates an idle-pending condition for the dually-connected UE. For example, communications component 606 of FIG. 6 may be operative to send a control message 626 to dually-connected UE 660 that indicates that dually-connected UE 660 is subject to an idle-pending condition. From 910, flow may pass to 912, where a state notification message may be received that indicates that the dually-connected UE is being transitioned to the idle state. For example, communications component 606 of FIG. 6 may be operative to receive a state notification message 618 from MeNB 670 that indicates that dually-connected UE 660 is being transitioned to the RRC_Idle state. Following 912, the logic flow may end.

Figure 10:
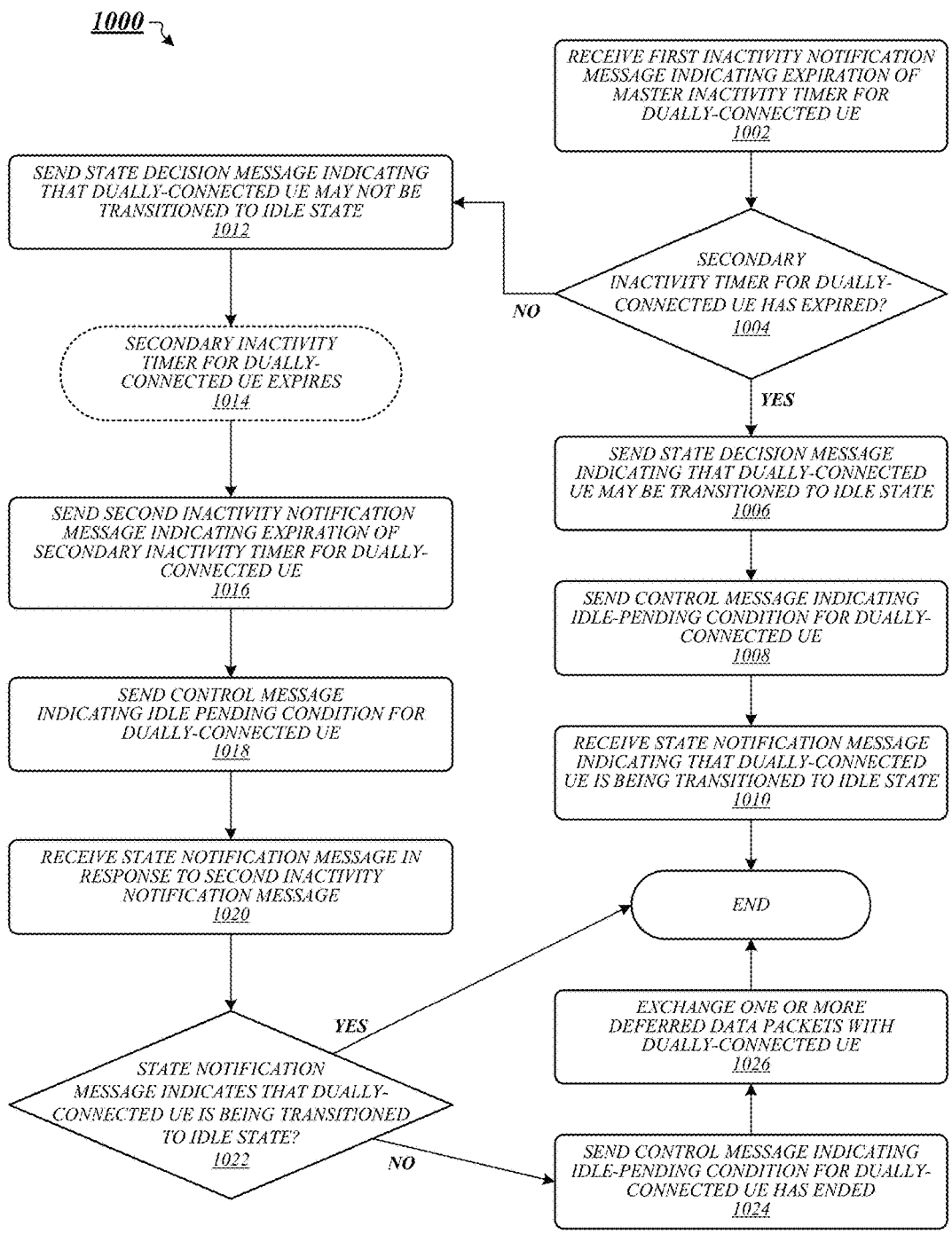
FIG. 10 illustrates an embodiment of a sixth logic flow.

FIG. 10 illustrates an embodiment of a logic flow 1000, which may be representative of operations performed in various embodiments described herein. For example, logic flow 1000 may be representative of operations that may be performed in some embodiments by apparatus 600 and/or system 640 of FIG. 6. More particularly, logic flow 1000 may be representative of various embodiments in which apparatus 600 and/or system 640 of FIG. 6 determines the small cell activity status of dually-connected UE 660 based on whether a secondary inactivity timer 614 for dually-connected UE 660 has expired.

As shown in logic flow 1000, a first inactivity notification message may be received at 1002 that indicates an expiration of a master inactivity timer for a dually-connected UE. For example, communications component 606 of FIG. 6 may be operative to receive an inactivity notification message 612 from MeNB 670 that indicates an expiration of a master inactivity timer 610 for dually-connected UE 660. In some embodiments, the indicated master inactivity timer expiration may already have occurred at the time that the inactivity notification message was sent. In various other embodiments, the inactivity notification message may have been sent in advance of the indicated master inactivity timer expiration. At 1004, it may be determined whether a secondary inactivity timer for the dually-connected UE has expired. For example, management component 608 of FIG. 6 may be operative to determine whether secondary inactivity timer 614 for dually-connected UE 660 has expired.

If it is determined at 1004 that the secondary inactivity timer for the dually-connected UE has expired, flow may pass to 1006. At 1006, a state decision message may be sent that indicates that the dually-connected UE may be transitioned to an idle state. For example, communications component 606 of FIG. 6 may be operative to send a state decision message 616 to MeNB 670 that indicates that dually-connected UE 660 may be transitioned to an RRC_Idle state. From 1006, flow may pass to 1008, where a control message may be sent that indicates an idle-pending condition for the dually-connected UE. For example, communications component 606 of FIG. 6 may be operative to send a control message 626 to dually-connected UE 660 that indicates that dually-connected UE 660 is subject to an idle-pending condition. From 1008, flow may pass to 1010, where a state notification message may be received that indicates that the dually-connected UE is being transitioned to the idle state. For example, communications component 606 of FIG. 6 may be operative to receive a state notification message 618 from MeNB 670 that indicates that dually-connected UE 660 is being transitioned to the RRC_Idle state. Following 1010, the logic flow may end.

If it is determined at 1004 that the secondary inactivity timer for the dually-connected UE has not expired, flow may pass to 1012. At 1012, a state decision message may be sent that indicates that the dually-connected UE may not be transitioned to the idle state. For example, communications component 606 of FIG. 6 may be operative to send a state decision message 616 to MeNB 670 that indicates that dually-connected UE 660 may not be transitioned to the RRC_Idle state. From 1012, flow may pass to 1014, where the secondary inactivity timer for the dually-connected UE may expire. For example, secondary inactivity timer 614 of FIG. 6 may expire. From 1014, flow may pass to 1016, where a second inactivity notification message may be sent that indicates that the secondary inactivity timer for the dually-connected UE has expired. For example, communications component 606 of FIG. 6 may be operative to send an inactivity notification message 622 to MeNB 670 that indicates that the secondary inactivity timer 614 for dually-connected UE 660 has expired.

From 1016, flow may pass to 1018, where a control message may be sent that indicates an idle-pending condition for the dually-connected UE. For example, communications component 606 of FIG. 6 may be operative to send a control message 626 to dually-connected UE 660 that indicates that dually-connected UE 660 is subject to an idle-pending condition. From 1018, flow may pass to 1020, where a state notification message may be received in response to the second inactivity notification message. For example, communications component 606 of FIG. 6 may be operative to receive state notification message 624 from MeNB 670 in response to inactivity notification message 622. From 1020, flow may pass to 1022, where it may be determined whether the state notification message indicates that the dually-connected UE is being transitioned to the idle state. For example, management component 608 of FIG. 6 may be operative to determine whether the state notification message 624 indicates that dually-connected UE 660 is being transitioned to the RRC_Idle state.

If it is determined at 1022 that the state notification message indicates that the dually-connected UE is being transitioned to the idle state, the logic flow may end. If it is determined at 1022 that the state notification message indicates that the dually-connected UE is not being transitioned to the idle state, flow may pass to 1024. At 1024, a control message may be sent that indicates that the idle-pending condition for the dually-connected has ended. For example, communications component 606 of FIG. 6 may be operative to send a control message 628 to dually-connected UE 660 that indicates that dually-connected UE 660 is no longer subject to the idle-pending condition. From 1024, flow may pass to 1026, where one or more deferred data packets may be exchanged with the dually-connected UE. For example, communications component 606 may be operative to receive one or more deferred UL data packets 630 from dually-connected UE 660 and/or send one or more deferred DL data packets 632 to dually-connected UE 660. Following 1026, the logic flow may end. The embodiments are not limited to these examples.

Figure 11:
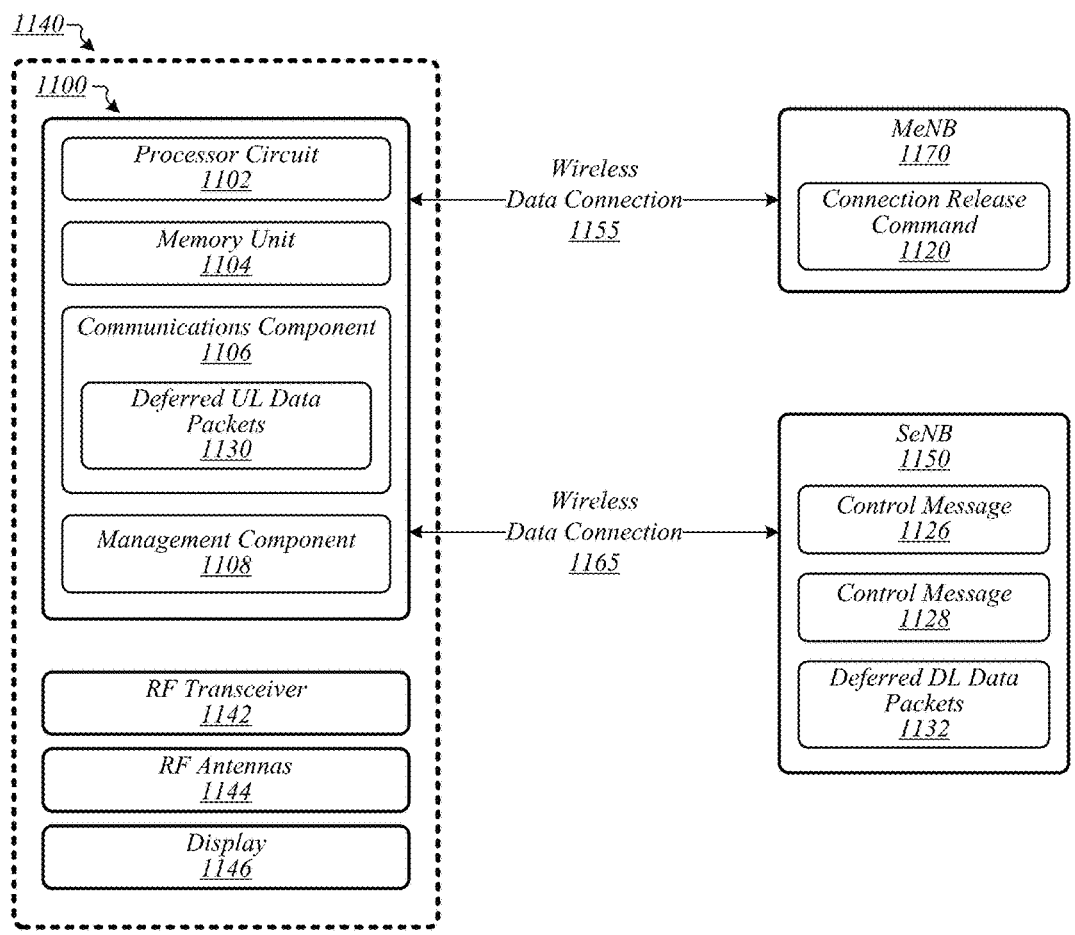
FIG. 11 illustrates an embodiment of a third apparatus and an embodiment of a third system.

FIG. 11 illustrates a block diagram of an apparatus 1100. Apparatus 1100 may be representative of a dually-connected UE to which the disclosed coordination techniques for RRC state management in dual-connectivity architectures may be applied in some embodiments. For example, apparatus 1100 may be representative of dually-connected UE 120 of FIG. 1, dually-connected UE 260 of FIG. 2, and/or dually-connected UE 660 of FIG. 6. As shown in FIG. 11, apparatus 1100 comprises multiple elements including a processor circuit 1102, a memory unit 1104, a communications component 1106, and a management component 1108. The embodiments, however, are not limited to the type, number, or arrangement of elements shown in this figure.

In various embodiments, apparatus 1100 may comprise processor circuit 1102. Processor circuit 1102 may be implemented using any processor or logic device, and may be the same as or similar to apparatus 200 of FIG. 2. The embodiments are not limited in this context.

In some embodiments, apparatus 1100 may comprise or be arranged to communicatively couple with a memory unit 1104. Memory unit 1104 may be implemented using any machine-readable or computer-readable media capable of storing data, including both volatile and non-volatile memory, and may be the same as or similar to memory unit 204 of FIG. 2. The embodiments are not limited in this context.

In various embodiments, apparatus 1100 may comprise a communications component 1106. Communications component 1106 may comprise logic, circuitry, and/or instructions operative to send messages to one or more remote devices and/or to receive messages from one or more remote devices. In some embodiments, communications component 1106 may be operative to send and/or receive messages over one or more wired connections, one or more wireless connections, or a combination of both. In various embodiments, communications component 1106 may additionally comprise logic, circuitry, and/or instructions operative to perform various operations in support of such communications. Examples of such operations may include selection of transmission and/or reception parameters and/or timing, packet and/or protocol data unit (PDU) construction and/or deconstruction, encoding and/or decoding, error detection, and/or error correction. The embodiments are not limited to these examples.

In some embodiments, apparatus 1100 may comprise a management component 1108. Management component 1108 may comprise logic, circuitry, and/or instructions operative to manage the connectivity state, communications activities, and/or other operations of apparatus 1100. In various embodiments, management component 1108 may be configured to perform various determinations, decisions, selections, operations, and/or actions in conjunction with such management. In some embodiments, management component 1108 may be configured to manage the connectivity state, communications activities, and/or other operations of apparatus 1100 based on one or more control message, commands, notifications, packets, or other communications received from one or more external control nodes. The embodiments are not limited in this context.

FIG. 11 also illustrates a block diagram of a system 1140. System 1140 may comprise any of the aforementioned elements of apparatus 1100. System 1140 may further comprise an RF transceiver 1142. RF transceiver 1142 may comprise one or more radios capable of transmitting and receiving signals using various suitable wireless communications techniques. Such techniques may involve communications across one or more wireless networks. Exemplary wireless networks may include, without limitation, any of the examples previously mentioned with respect to RF transceiver 242 of FIG. 2 and/or RF transceiver 642 of FIG. 6. In communicating across such networks, RF transceiver 1142 may operate in accordance with one or more applicable standards in any version. The embodiments are not limited in this context.

In various embodiments, system 1140 may comprise one or more RF antennas 1144. Examples of any particular RF antenna 1144 may include, without limitation, any of the examples previously mentioned with respect to RF antenna(s) 244 of FIG. 2 and/or RF antenna(s) 644 of FIG. 6. In some embodiments, RF transceiver 1142 may be operative to send and/or receive messages and/or data using one or more RF antennas 1144. The embodiments are not limited in this context.

In various embodiments, system 1140 may comprise a display 1146. Display 1146 may comprise any display device capable of displaying information received from processor circuit 1102. In some embodiments, display 1146 may comprise a touch-sensitive display screen ("touchscreen"). In various embodiments, display 1146 may comprise a monitor, a computer screen, a television, a projector, or another type of display device. In some embodiments, display 1146 may be implemented by a liquid crystal display (LCD), light emitting diode (LED) or other type of suitable visual interface. In various embodiments, display 1146 may comprise an LCD that includes one or more thin-film transistors (TFTs). The embodiments are not limited in this context.

During general operation, apparatus 1100 and/or system 1140 may be operative to establish concurrent data connectivity with an MeNB 1170 and an SeNB 1150. In some embodiments, SeNB 1150 may provide wireless service within a small cell within which apparatus 1100 and/or system 1140 is located, and MeNB 1170 may provide wireless service within a macro cell that is overlaid upon that small cell. In various embodiments, MeNB 1170 may be the same as or similar to apparatus 200 and/or system 240 of FIG. 2 and/or MeNB 670 of FIG. 6. In some embodiments, SeNB 1150 may be the same as or similar to SeNB 250 of FIG. 2 and/or apparatus 600 and/or system 640 of FIG. 6. In various embodiments, apparatus 1100 and/or system 1140 may possess data connectivity with MeNB 1170 via a wireless data connection 1155 and may possess data connectivity with SeNB 1150 via a wireless data connection 1165. In some embodiments, wireless data connections 1155 and 1165 may utilize different wireless communication frequencies. The embodiments are not limited in this context.

In various embodiments, apparatus 1100 and/or system 1140 may be configured to observe a same RRC state with respect to SeNB 1150 as it does with respect to MeNB 1170. In some embodiments, apparatus 1100 and/or system 1140 may be configured either to observe an RRC_Connected state with respect to both MeNB 1170 and SeNB 1150 or to observe an RRC_Idle state with respect to both MeNB 1170 and SeNB 1150. In various embodiments, while in the dual-connectivity mode of operation, apparatus 1100 and/or system 1140 may observe an RRC_Connected state with respect to both MeNB 1170 and SeNB 1150. In some embodiments, MeNB 1170 may be responsible for sending RRC messages to apparatus 1100 and/or system 1140 in order to provide apparatus 1100 and/or system 1140 with any desired instructions regarding its RRC state. In various embodiments, SeNB 1150 may not be configured with the ability to send RRC messages to UEs, and thus may be unable to send RRC messages to apparatus 1100 and/or system 1140. The embodiments are not limited in this context.

In some embodiments, MeNB 1170 may be configured to use an RRC state management handshake to coordinate with SeNB 1150 in conjunction with managing the RRC state of apparatus 1100 and/or system 1140. In various embodiments, during the RRC state management handshake, SeNB 1150 may be operative to determine that apparatus 1100 and/or system 1140 is subject to an idle-pending condition. In some embodiments, SeNB 1150 may be operative to send a control message 1126 to apparatus 1100 and/or system 1140 that indicates that apparatus 1100 and/or system 1140 is subject to the idle-pending condition. In various embodiments, control message 1126 may comprise a MAC CE. In some embodiments, control message 1126 may be the same as or similar to control message 626 of FIG. 6 and/or control message 700 of FIG. 7. The embodiments are not limited in this context.

In various embodiments, in response to receipt of control message 1126 by communications component 1106, management component 1108 may be operative to determine that apparatus 1100 and/or system 1140 should refrain from performing UL data transmissions to SeNB 1150, pending resolution of the idle-pending condition. In some embodiments, management component 1108 may be operative to defer transmission of one or more UL data packets while apparatus 1100 and/or system 1140 is subject to the idle-pending condition. In various embodiments, in response to its aforementioned determination that apparatus 1100 and/or system 1140 is subject to the idle-pending condition, SeNB 1150 may be operative to determine that it should refrain from performing DL data transmissions to apparatus 1100 and/or system 1140, pending resolution of the idle-pending condition. In some embodiments, SeNB 1150 may be operative to defer transmission of one or more DL data packets while apparatus 1100 and/or system 1140 is subject to the idle-pending condition. The embodiments are not limited in this context.

In various embodiments, while apparatus 1100 and/or system 1140 is subject to the idle-pending condition, MeNB 1170 may be operative to determine to maintain apparatus 1100 and/or system 1140 in an RRC_Connected state. In some embodiments, MeNB 1170 may be operative to inform SeNB 1150 of this determination in conjunction with the RRC state management handshake. In various embodiments, based on the knowledge that apparatus 1100 and/or system 1140 will be maintained in the RRC_Connected state, SeNB 1150 may be operative to determine that apparatus 1100 and/or system 1140 is no longer subject to the idle-pending condition. In some embodiments, SeNB 1150 may be operative to send a control message 1128 to apparatus 1100 and/or system 1140 that indicates that apparatus 1100 and/or system 1140 is no longer subject to the idle-pending condition. In various embodiments, control message 1128 may comprise a MAC CE. In some embodiments, control message 1128 may be the same as or similar to control message 628 of FIG. 6 and/or control message 700 of FIG. 7. In various embodiments, control message 1128 may be the same as or similar to control message 1126. The embodiments are not limited in this context.

In some embodiments, in response to receipt of control message 1128 by communications component 1106, management component 1108 may be operative to determine that apparatus 1100 and/or system 1140 is no longer subject to the idle-pending condition. In various embodiments, in response to this determination, communications component 1106 may be operative to resume UL data transmission to SeNB 1150. In some embodiments, in response to its aforementioned determination that apparatus 1100 and/or system 1140 is no longer subject to the idle-pending condition, SeNB 1150 may be operative to resume DL data transmission to apparatus 1100 and/or system 1140. In various embodiments, following receipt by communications component 1106 of control message 1128, apparatus 1100 and/or system 1140 and SeNB 1150 may exchange one or more deferred data packets. In some embodiments in which management component 1108 deferred transmission of one or more UL data packets to SeNB 1150, communications component 1106 may be operative to send one or more deferred UL data packets 1130 to SeNB 1150. In various embodiments in which SeNB 1150 deferred transmission of one or more DL data packets to apparatus 1100 and/or system 1140, SeNB 1150 may be operative to send one or more deferred DL data packets 1132 to apparatus 1100 and/or system 1140. The embodiments are not limited in this context.

In some embodiments, while apparatus 1100 and/or system 1140 is subject to the idle-pending condition, MeNB 1170 may be operative to determine to transition apparatus 1100 and/or system 1140 to an RRC_Idle state. In various embodiments, MeNB 1170 may be operative to initiate a state transition procedure to transition apparatus 1100 and/or system 1140 to the RRC_Idle state. In some embodiments, in conjunction with the state transition procedure, MeNB 1170 may be operative to send a connection release command 1120 to apparatus 1100 and/or system 1140. In various embodiments, connection release command 1120 may notify apparatus 1100 and/or system 1140 that its wireless data connections 1155 and 1165 are to be released and that it is to enter the RRC_Idle state. In some embodiments, in response to receipt by communications component 1106 of connection release command 1120, apparatus 1100 and/or system 1140 may be operative to enter the RRC_Idle state. The embodiments are not limited in this context.

Figure 12:
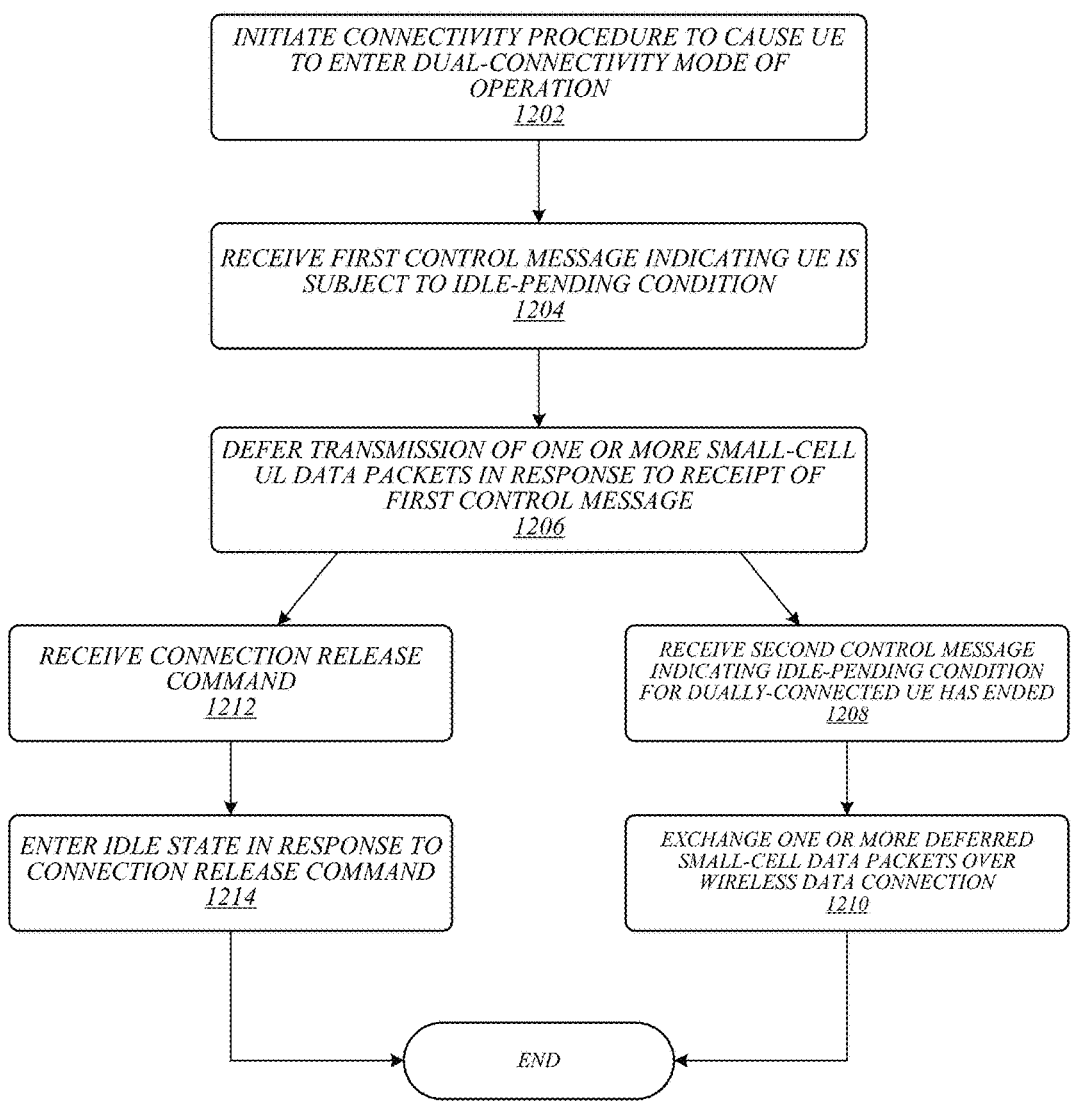
FIG. 12 illustrates an embodiment of a seventh logic flow.

FIG. 12 illustrates an embodiment of a logic flow 1200, which may be representative of operations performed in various embodiments described herein. For example, logic flow 1200 may be representative of operations that may be performed in some embodiments by apparatus 1100 and/or system 1140 of FIG. 11. As shown in FIG. 12, a connectivity procedure may be initiated at 1202 to cause a UE to enter a dual-connectivity mode of operation. For example, management component 1108 of FIG. 11 may be operative to initiate a connectivity procedure to cause apparatus 1100 and/or system 1140 to establish dual connectivity with MeNB 1170 and SeNB 1150.

At 1204, while the UE is in the dual-connectivity mode of operation, a first control message may be received that indicates that the UE is subject to an idle-pending condition. For example, communications component 1106 of FIG. 11 may be operative to receive a control message 1126 from SeNB 1150 that indicates that apparatus 1100 and/or system 1140 is subject to an idle-pending condition. At 1206, transmission of one or more small-cell UL data packets may be deferred in response to receipt of the first control message. For example, communications component 1106 of FIG. 11 may be operative to defer transmission of one or more UL data packets to SeNB 1150 in response to receipt of the control message 1126.

From 1206, flow may pass either to 1208 or 1212. At 1208, a second control message may be received that indicates that the idle-pending condition for the dually-connected UE has ended. For example, communications component 1106 of FIG. 11 may be operative to receive a control message 1128 from SeNB 1150 that indicates that apparatus 1100 and/or system 1140 is no longer subject to the idle-pending condition. From 1208, flow may pass to 1210, where one or more deferred small-cell data packets may be exchanged over a wireless data connection. For example, communications component 1106 of FIG. 11 may be operative to send one or more deferred UL data packets 1130 to SeNB 1150, receive one or more deferred DL data packets 1132 from SeNB 1150, or both. Following 1210, the logic flow may end.

As noted above, rather than passing from 1206 to 1208, flow may pass from 1206 to 1212. At 1212, a connection release command may be received. For example, communications component 1106 of FIG. 11 may be operative to receive a connection release command 1120 from MeNB 1170. From 1212, flow may pass to 1214, where an idle state may be entered in response to the connection release command. For example, apparatus 1100 and/or system 1140 of FIG. 11 may be operative to enter an RRC_Idle state in response to the connection release command 1120. Following 1214, the logic flow may end. The embodiments are not limited to these examples.

Figure 13A:
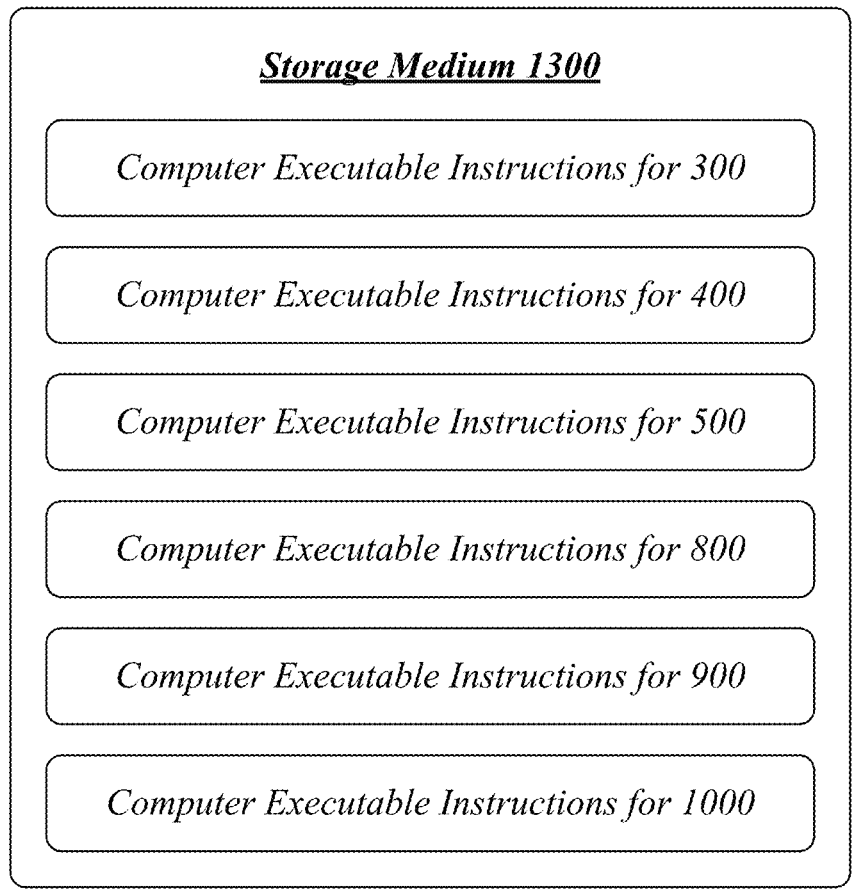
FIG. 13A illustrates an embodiment of a first storage medium.

FIG. 13A illustrates an embodiment of a first storage medium 1300. Storage medium 1300 may comprise any non-transitory computer-readable storage medium or machine-readable storage medium, such as an optical, magnetic or semiconductor storage medium. In various embodiments, storage medium 1300 may comprise an article of manufacture. In some embodiments, storage medium 1300 may store computer-executable instructions, such as computer-executable instructions to implement one or more of logic flow 300 of FIG. 3, logic flow 400 of FIG. 4, logic flow 500 of FIG. 5, logic flow 800 of FIG. 8, logic flow 900 of FIG. 9, and logic flow 1000 of FIG. 10. In various embodiments, storage medium 1300 may comprise one or more sets of instructions for execution by an MeNB or SeNB in order to implement one or more of logic flow 300 of FIG. 3, logic flow 400 of FIG. 4, logic flow 500 of FIG. 5, logic flow 800 of FIG. 8, logic flow 900 of FIG. 9, and logic flow 1000 of FIG. 10. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

Figure 13B:
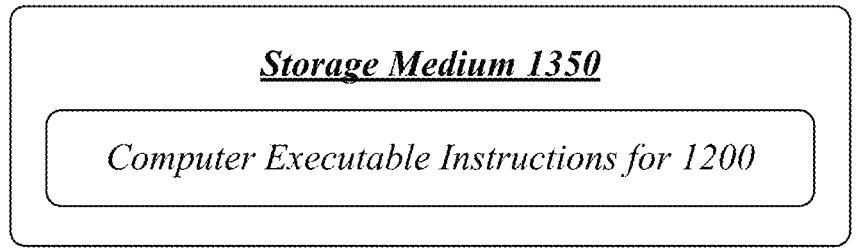
FIG. 13B illustrates an embodiment of a second storage medium.

FIG. 13B illustrates an embodiment of a second storage medium 1350. Storage medium 1350 may comprise any non-transitory computer-readable storage medium or machine-readable storage medium, such as an optical, magnetic or semiconductor storage medium. In various embodiments, storage medium 1350 may comprise an article of manufacture. In some embodiments, storage medium 1350 may store computer-executable instructions, such as computer-executable instructions to implement logic flow 1200 of FIG. 12. In various embodiments, storage medium 1350 may comprise one or more sets of instructions for execution by a UE in order to implement logic flow 1200 of FIG. 12. The embodiments are not limited in this context.

Figure 14:
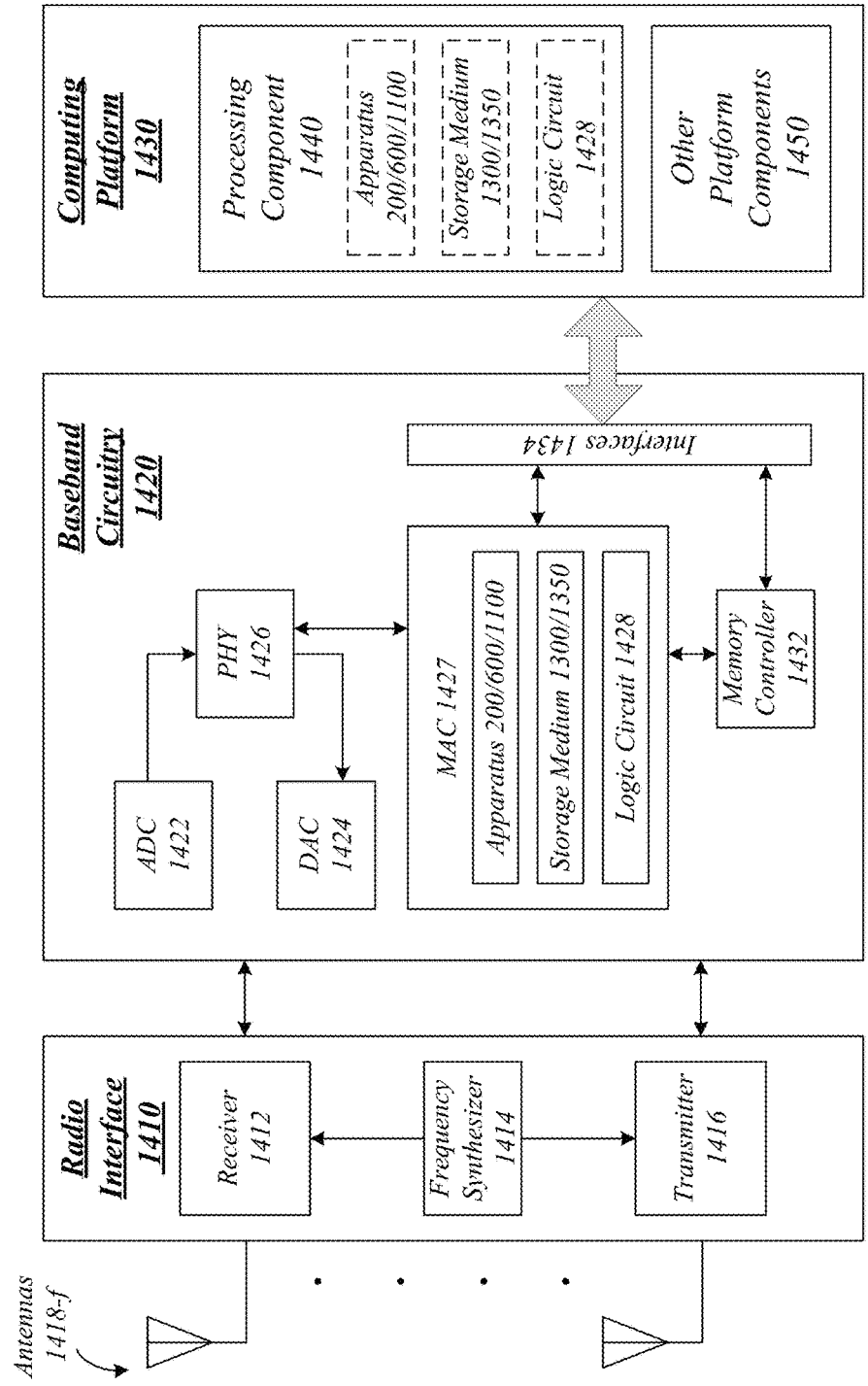
FIG. 14 illustrates an embodiment a device.

FIG. 14 illustrates an embodiment of a communications device 1400 that may implement one or more of apparatus 200 and/or system 240 of FIG. 2, logic flow 300 of FIG. 3, logic flow 400 of FIG. 4, logic flow 500 of FIG. 5, apparatus 600 and/or system 640 of FIG. 6, logic flow 800 of FIG. 8, logic flow 900 of FIG. 9, logic flow 1000 of FIG. 10, apparatus 1100 and/or system 1140 of FIG. 11, logic flow 1200 of FIG. 12, storage medium 1300 of FIG. 13A, and storage medium 1350 of FIG. 13B. In various embodiments, device 1400 may comprise a logic circuit 1428. The logic circuit 1428 may include physical circuits to perform operations described for one or more of apparatus 200 and/or system 240 of FIG. 2, logic flow 300 of FIG. 3, logic flow 400 of FIG. 4, logic flow 500 of FIG. 5, apparatus 600 and/or system 640 of FIG. 6, logic flow 800 of FIG. 8, logic flow 900 of FIG. 9, logic flow 1000 of FIG. 10, apparatus 1100 and/or system 1140 of FIG. 11, and logic flow 1200 of FIG. 12, for example. As shown in FIG. 14, device 1400 may include a radio interface 1410, baseband circuitry 1420, and computing platform 1430, although the embodiments are not limited to this configuration.

The device 1400 may implement some or all of the structure and/or operations for one or more of apparatus 200 and/or system 240 of FIG. 2, logic flow 300 of FIG. 3, logic flow 400 of FIG. 4, logic flow 500 of FIG. 5, apparatus 600 and/or system 640 of FIG. 6, logic flow 800 of FIG. 8, logic flow 900 of FIG. 9, logic flow 1000 of FIG. 10, apparatus 1100 and/or system 1140 of FIG. 11, logic flow 1200 of FIG. 12, storage medium 1300 of FIG. 13A, storage medium 1350 of FIG. 13B, and logic circuit 1428 in a single computing entity, such as entirely within a single device. Alternatively, the device 1400 may distribute portions of the structure and/or operations for one or more of apparatus 200 and/or system 240 of FIG. 2, logic flow 300 of FIG. 3, logic flow 400 of FIG. 4, logic flow 500 of FIG. 5, apparatus 600 and/or system 640 of FIG. 6, logic flow 800 of FIG. 8, logic flow 900 of FIG. 9, logic flow 1000 of FIG. 10, apparatus 1100 and/or system 1140 of FIG. 11, logic flow 1200 of FIG. 12, storage medium 1300 of FIG. 13A, storage medium 1350 of FIG. 13B, and logic circuit 1428 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 1410 may include a component or combination of components adapted for transmitting and/or receiving single-carrier or multi-carrier modulated signals (e.g., including complementary code keying (CCK), orthogonal frequency division multiplexing (OFDM), and/or single-carrier frequency division multiple access (SC-FDMA) symbols) although the embodiments are not limited to any specific over-the-air interface or modulation scheme. Radio interface 1410 may include, for example, a receiver 1412, a frequency synthesizer 1414, and/or a transmitter 1416. Radio interface 1410 may include bias controls, a crystal oscillator and/or one or more antennas 1418-f. In another embodiment, radio interface 1410 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1420 may communicate with radio interface 1410 to process receive and/or transmit signals and may include, for example, an analog-to-digital converter 1422 for down converting received signals, a digital-to-analog converter 1424 for up converting signals for transmission. Further, baseband circuitry 1420 may include a baseband or physical layer (PHY) processing circuit 1426 for PHY link layer processing of respective receive/transmit signals. Baseband circuitry 1420 may include, for example, a medium access control (MAC) processing circuit 1427 for MAC/data link layer processing. Baseband circuitry 1420 may include a memory controller 1432 for communicating with MAC processing circuit 1427 and/or a computing platform 1430, for example, via one or more interfaces 1434.

In some embodiments, PHY processing circuit 1426 may include a frame construction and/or detection module, in combination with additional circuitry such as a buffer memory, to construct and/or deconstruct communication frames. Alternatively or in addition, MAC processing circuit 1427 may share processing for certain of these functions or perform these processes independent of PHY processing circuit 1426. In some embodiments, MAC and PHY processing may be integrated into a single circuit.

The computing platform 1430 may provide computing functionality for the device 1400. As shown, the computing platform 1430 may include a processing component 1440. In addition to, or alternatively of, the baseband circuitry 1420, the device 1400 may execute processing operations or logic for one or more of apparatus 200 and/or system 240 of FIG. 2, logic flow 300 of FIG. 3, logic flow 400 of FIG. 4, logic flow 500 of FIG. 5, apparatus 600 and/or system 640 of FIG. 6, logic flow 800 of FIG. 8, logic flow 900 of FIG. 9, logic flow 1000 of FIG. 10, apparatus 1100 and/or system 1140 of FIG. 11, logic flow 1200 of FIG. 12, storage medium 1300 of FIG. 13A, storage medium 1350 of FIG. 13B, and logic circuit 1428 using the processing component 1440. The processing component 1440 (and/or PHY 1426 and/or MAC 1427) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1430 may further include other platform components 1450. Other platform components 1450 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 1400 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, display, television, digital television, set top box, wireless access point, base station, node B, subscriber station, mobile subscriber center, radio network controller, router, hub, gateway, bridge, switch, machine, or combination thereof. Accordingly, functions and/or specific configurations of device 1400 described herein, may be included or omitted in various embodiments of device 1400, as suitably desired.

Embodiments of device 1400 may be implemented using single input single output (SISO) architectures. However, certain implementations may include multiple antennas (e.g., antennas 1418-f) for transmission and/or reception using adaptive antenna techniques for beamforming or spatial division multiple access (SDMA) and/or using MIMO communication techniques.

The components and features of device 1400 may be implemented using any combination of discrete circuitry, application specific integrated circuits (ASICs), logic gates and/or single chip architectures. Further, the features of device 1400 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1400 shown in the block diagram of FIG. 14 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

Figure 15:
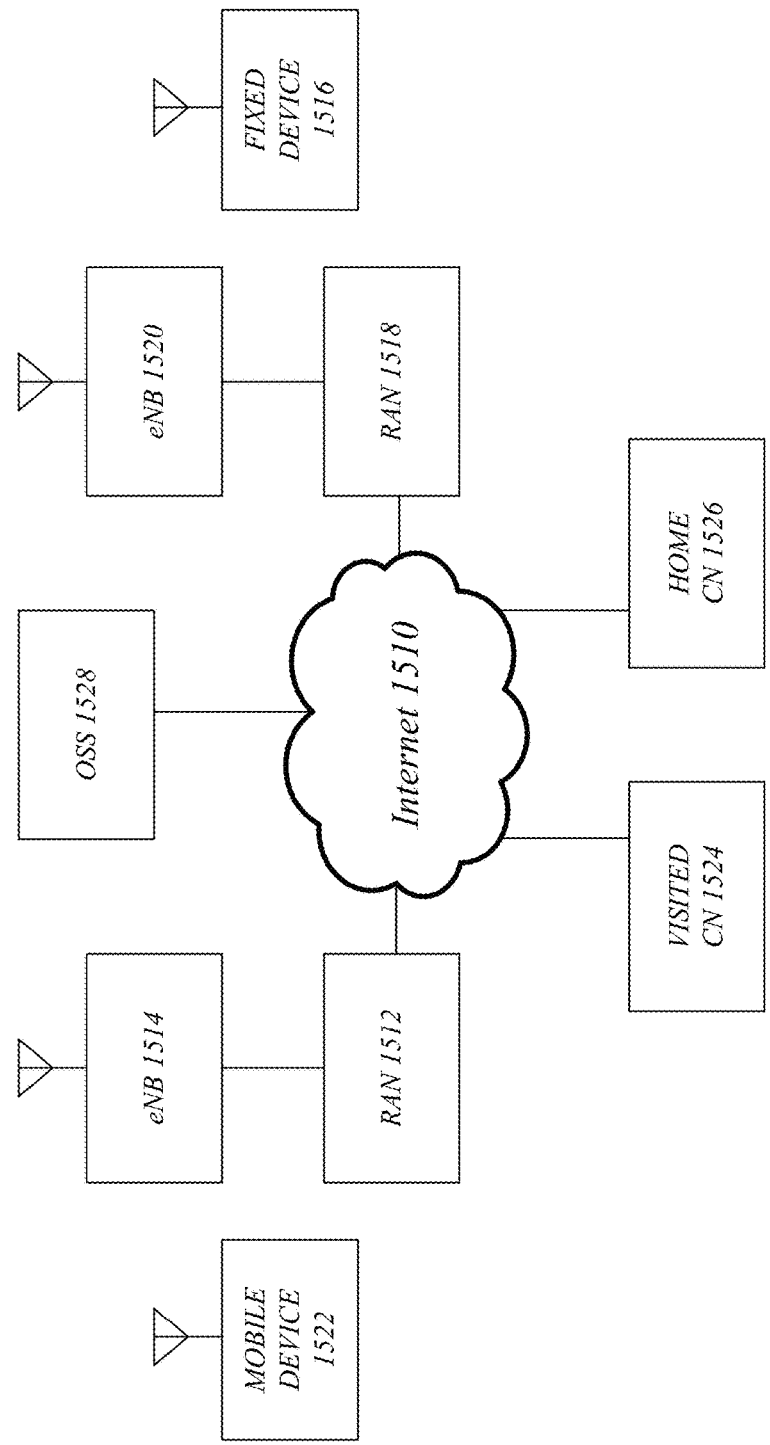
FIG. 15 illustrates an embodiment of a wireless network.

FIG. 15 illustrates an embodiment of a broadband wireless access system 1500. As shown in FIG. 15, broadband wireless access system 1500 may be an internet protocol (IP) type network comprising an internet 1510 type network or the like that is capable of supporting mobile wireless access and/or fixed wireless access to internet 1510. In one or more embodiments, broadband wireless access system 1500 may comprise any type of orthogonal frequency division multiple access (OFDMA)-based or single-carrier frequency division multiple access (SC-FDMA)-based wireless network, such as a system compliant with one or more of the 3GPP LTE Specifications and/or IEEE 802.16 Standards, and the scope of the claimed subject matter is not limited in these respects.

In the exemplary broadband wireless access system 1500, radio access networks (RANs) 1512 and 1518 are capable of coupling with evolved node Bs (eNBs) 1514 and 1520, respectively, to provide wireless communication between one or more fixed devices 1516 and internet 1510 and/or between or one or more mobile devices 1522 and Internet 1510. One example of a fixed device 1516 and a mobile device 1522 is device 1400 of FIG. 14, with the fixed device 1516 comprising a stationary version of device 1400 and the mobile device 1522 comprising a mobile version of device 1400. RANs 1512 and 1518 may implement profiles that are capable of defining the mapping of network functions to one or more physical entities on broadband wireless access system 1500. eNBs 1514 and 1520 may comprise radio equipment to provide RF communication with fixed device 1516 and/or mobile device 1522, such as described with reference to device 1400, and may comprise, for example, the PHY and MAC layer equipment in compliance with a 3GPP LTE Specification or an IEEE 802.16 Standard. eNBs 1514 and 1520 may further comprise an IP backplane to couple to Internet 1510 via RANs 1512 and 1518, respectively, although the scope of the claimed subject matter is not limited in these respects.

Broadband wireless access system 1500 may further comprise a visited core network (CN) 1524 and/or a home CN 1526, each of which may be capable of providing one or more network functions including but not limited to proxy and/or relay type functions, for example authentication, authorization and accounting (AAA) functions, dynamic host configuration protocol (DHCP) functions, or domain name service controls or the like, domain gateways such as public switched telephone network (PSTN) gateways or voice over internet protocol (VoIP) gateways, and/or internet protocol (IP) type server functions, or the like. However, these are merely example of the types of functions that are capable of being provided by visited CN 1524 and/or home CN 1526, and the scope of the claimed subject matter is not limited in these respects. Visited CN 1524 may be referred to as a visited CN in the case where visited CN 1524 is not part of the regular service provider of fixed device 1516 or mobile device 1522, for example where fixed device 1516 or mobile device 1522 is roaming away from its respective home CN 1526, or where broadband wireless access system 1500 is part of the regular service provider of fixed device 1516 or mobile device 1522 but where broadband wireless access system 1500 may be in another location or state that is not the main or home location of fixed device 1516 or mobile device 1522. The embodiments are not limited in this context.

Fixed device 1516 may be located anywhere within range of one or both of eNBs 1514 and 1520, such as in or near a home or business to provide home or business customer broadband access to Internet 1510 via eNBs 1514 and 1520 and RANs 1512 and 1518, respectively, and home CN 1526. It is worthy of note that although fixed device 1516 is generally disposed in a stationary location, it may be moved to different locations as needed. Mobile device 1522 may be utilized at one or more locations if mobile device 1522 is within range of one or both of eNBs 1514 and 1520, for example. In accordance with one or more embodiments, operation support system (OSS) 1528 may be part of broadband wireless access system 1500 to provide management functions for broadband wireless access system 1500 and to provide interfaces between functional entities of broadband wireless access system 1500. Broadband wireless access system 1500 of FIG. 15 is merely one type of wireless network showing a certain number of the components of broadband wireless access system 1500, and the scope of the claimed subject matter is not limited in these respects.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Example 1 is a master evolved node B (MeNB), comprising logic, at least a portion of which is in hardware, the logic to send an inactivity notification message to indicate an expiration of a master inactivity timer for a dually-connected user equipment (UE), receive a state decision message in response to the inactivity notification message, and determine whether to transition the dually-connected UE to an idle state based on the state decision message.

In Example 2, the logic of Example 1 may optionally send the inactivity notification message to initiate a radio resource control (RRC) state management handshake for determining whether to transition the dually-connected UE to the idle state.

In Example 3, the logic of any of Examples 1 to 2 may optionally send the inactivity notification message to a secondary evolved node B (SeNB) for the dually-connected UE.

In Example 4, the logic of any of Examples 1 to 3 may optionally send the inactivity notification message over an X2 interface connection.

In Example 5, the X2 interface connection of Example 4 may optionally be implemented using a non-ideal backhaul.

In Example 6, the logic of any of Examples 1 to 5 may optionally send the inactivity notification message in advance of the expiration of the master inactivity timer.

In Example 7, the master inactivity timer of any of Examples 1 to 6 may optionally comprise an RRC_Inactivity_Timer for the dually-connected UE.

In Example 8, the logic of any of Examples 1 to 7 may optionally reset the master inactivity timer in response to a receipt of a data packet from the dually-connected UE.

In Example 9, the logic of any of Examples 1 to 8 may optionally transition the dually-connected UE to the idle state in response to a determination that the state decision message indicates that the dually-connected UE may be transitioned to the idle state.

In Example 10, the logic of Example 9 may optionally send a connection release command to transition the dually-connected UE to the idle state.

In Example 11, the logic of any of Examples 9 to 10 may optionally send a state notification message to indicate that the dually-connected UE is being transitioned to the idle state.

In Example 12, the idle state of any of Examples 1 to 11 may optionally comprise an RRC_Idle state.

In Example 13, the logic of any of Examples 1 to 8 may optionally maintain the dually-connected UE in a connected state in response to a determination that the state decision message indicates that the dually-connected UE may not be transitioned to the idle state.

In Example 14, the logic of Example 13 may optionally reset the master inactivity timer in response to the determination that the state decision message indicates that the dually-connected UE may not be transitioned to the idle state.

In Example 15, the logic of any of Examples 1 to 8 may optionally maintain the dually-connected UE in a provisional connected state in response to a determination that the state decision message indicates that the dually-connected UE may not be transitioned to the idle state.

In Example 16, the logic of Example 15 may optionally determine whether to transition the dually-connected UE to the idle state or maintain the dually-connected UE in a connected state in response to receipt of a second inactivity notification message indicating an expiration of a secondary inactivity timer for the dually-connected UE.

In Example 17, the logic of Example 16 may optionally determine whether to transition the dually-connected UE to the idle state or maintain the dually-connected UE in a connected state based on whether the master inactivity timer for the dually-connected UE is running or expired.

In Example 18, the logic of Example 17 may optionally transition the dually-connected UE to the idle state in response to a determination that the master inactivity timer for the dually-connected UE is expired.

In Example 19, the logic of Example 17 may optionally maintain the dually-connected UE in the connected state in response to a determination that the master inactivity timer for the dually-connected UE is running.

In Example 20, the MeNB of any of Examples 1 to 19 may optionally comprise a radio frequency (RF) transceiver, and one or more RF antennas.

Example 21 is at least one non-transitory computer-readable storage medium, comprising a set of wireless communication instructions that, in response to being executed on a computing device, cause a secondary evolved node B (SeNB) to receive an inactivity notification message indicating an expiration of a master inactivity timer for a dually-connected user equipment (UE), determine whether the dually-connected UE may be transitioned to an idle state based on a small cell activity status for the dually-connected UE, and send a state decision message to indicate whether the dually-connected UE may be transitioned to the idle state.

In Example 22, the at least one non-transitory computer-readable storage medium of Example 21 may optionally comprise wireless communication instructions that, in response to being executed on the computing device, cause the SeNB to determine the small cell activity status for the dually-connected UE based on whether there is ongoing data packet activity between the dually-connected UE and the SeNB.

In Example 23, the at least one non-transitory computer-readable storage medium of Example 22 may optionally comprise wireless communication instructions that, in response to being executed on the computing device, cause the SeNB to determine that the small cell activity status for the dually-connected UE comprises an active status when there is ongoing data packet activity between the dually-connected UE and the SeNB.

In Example 24, the at least one non-transitory computer-readable storage medium of Example 22 may optionally comprise wireless communication instructions that, in response to being executed on the computing device, cause the SeNB to determine that the small cell activity status for the dually-connected UE comprises an inactive status when there is no ongoing data packet activity between the dually-connected UE and the SeNB.

In Example 25, the at least one non-transitory computer-readable storage medium of any of Examples 21 to 24 may optionally comprise wireless communication instructions that, in response to being executed on the computing device, cause the SeNB to determine the small cell activity status for the dually-connected UE based on a secondary inactivity timer for the dually-connected UE.

In Example 26, the at least one non-transitory computer-readable storage medium of Example 25 may optionally comprise wireless communication instructions that, in response to being executed on the computing device, cause the SeNB to determine that the small cell activity status for the dually-connected UE comprises an active status when secondary inactivity timer for the dually-connected UE is running.

In Example 27, the at least one non-transitory computer-readable storage medium of Example 25 may optionally comprise wireless communication instructions that, in response to being executed on the computing device, cause the SeNB to determine that the small cell activity status for the dually-connected UE comprises an inactive status when secondary inactivity timer for the dually-connected UE is expired.

In Example 28, the at least one non-transitory computer-readable storage medium of any of Examples 21 to 27 may optionally comprise wireless communication instructions that, in response to being executed on the computing device, cause the SeNB to determine that the dually-connected UE may not be transitioned to the idle state in response to a determination that the small cell activity status for the dually-connected UE comprises an active status.

In Example 29, the at least one non-transitory computer-readable storage medium of Example 28 may optionally comprise wireless communication instructions that, in response to being executed on the computing device, cause the SeNB to detect an expiration of a secondary inactivity timer for the dually-connected UE, and send a second inactivity notification message indicating the expiration of the secondary inactivity timer for the dually-connected UE.

In Example 30, the at least one non-transitory computer-readable storage medium of Example 29 may optionally comprise wireless communication instructions that, in response to being executed on the computing device, cause the SeNB to send a first control message to indicate an idle-pending condition for the dually-connected UE.

In Example 31, the first control message of Example 30 may optionally comprise a medium access control (MAC) control element (CE).

In Example 32, the MAC CE of Example 31 may optionally comprise a five-bit logical channel identifier (LCID) value from among the range 01011 to 11001.

In Example 33, the at least one non-transitory computer-readable storage medium of any of Examples 29 to 32 may optionally comprise wireless communication instructions that, in response to being executed on the computing device, cause the SeNB to receive a state notification message in response to the second inactivity notification message.

In Example 34, the at least one non-transitory computer-readable storage medium of Example 33 may optionally comprise wireless communication instructions that, in response to being executed on the computing device, cause the SeNB to send a second control message in response to a determination that the state notification message indicates that the dually-connected UE is not being transitioned to the idle state, the second control message to indicate that the idle-pending condition for the dually-connected UE has ended.

In Example 35, the second control message of Example 34 may optionally comprise a same MAC CE as the first control message.

In Example 36, the at least one non-transitory computer-readable storage medium of any of Examples 33 to 35 may optionally comprise wireless communication instructions that, in response to being executed on the computing device, cause the SeNB to exchange one or more deferred data packets in response to a determination that the state notification message indicates that the dually-connected UE is not being transitioned to the idle state.

In Example 37, the at least one non-transitory computer-readable storage medium of any of Examples 21 to 27 may optionally comprise wireless communication instructions that, in response to being executed on the computing device, cause the SeNB to determine that the dually-connected UE may be transitioned to the idle state in response to a determination that the small cell activity status for the dually-connected UE comprises an inactive status.

In Example 38, the at least one non-transitory computer-readable storage medium of Example 37 may optionally comprise wireless communication instructions that, in response to being executed on the computing device, cause the SeNB to send a state decision message to indicate that the dually-connected UE may be transitioned to the idle state and send a control message to indicate an idle-pending condition for the dually-connected UE.

In Example 39, the control message of Example 38 may optionally comprise a medium access control (MAC) control element (CE).

In Example 40, the at least one non-transitory computer-readable storage medium of any of Examples 21 to 39 may optionally comprise wireless communication instructions that, in response to being executed on the computing device, cause the SeNB to send the state decision message to a master evolved node B (MeNB) for the dually-connected UE.

In Example 41, the at least one non-transitory computer-readable storage medium of any of Examples 21 to 40 may optionally comprise wireless communication instructions that, in response to being executed on the computing device, cause the SeNB to send the state decision message over an X2 interface connection.

In Example 42, the X2 interface connection of Example 41 may optionally be implemented using a non-ideal backhaul.

In Example 43, the master inactivity timer of any of Examples 21 to 42 may optionally comprise an RRC_Inactivity_Timer for the dually-connected UE.

Example 44 is a wireless communication method, comprising initiating, by a processor circuit, a connectivity procedure to cause a user equipment (UE) to enter a dual-connectivity mode of operation, and in response to a receipt of a first control message indicating that the UE is subject to an idle-pending condition, deferring transmission of one or more small-cell uplink (UL) data packets.

In Example 45, the connectivity procedure of Example 44 may optionally comprise establishing concurrent data connectivity with a master evolved node B (MeNB) and a secondary evolved node B (SeNB).

In Example 46, the first control message of any of Examples 44 to 45 may optionally comprise a medium access control (MAC) control element (CE).

In Example 47, the wireless communication method of any of Examples 44 to 46 may optionally comprise causing the UE to enter an RRC_Idle state in response to a receipt of a connection release command while the UE is subject to the idle-pending condition.

In Example 48, the wireless communication method of any of Examples 44 to 46 may optionally comprise exchanging one or more deferred small-cell data packets over a wireless connection in response to receipt of a second control message indicating that the UE is no longer subject to the idle-pending condition.

In Example 49, the second control message of Example 48 may optionally comprise a same medium access control (MAC) control element (CE) as the first control message.

Example 50 is at least one non-transitory computer-readable storage medium, comprising a set of instructions that, in response to being executed on a computing device, cause the computing device to perform a wireless communication method according to any of Examples 44 to 49.

Example 51 is an apparatus, comprising means for performing a wireless communication method according to any of Examples 44 to 49.

Example 52 is a system, comprising an apparatus according to Example 51, a radio frequency (RF) transceiver, and one or more RF antennas.

In Example 53, the system of Example 52 may optionally comprise a display.

Example 54 is a wireless communication apparatus, comprising means for receiving an inactivity notification message indicating an expiration of a master inactivity timer for a dually-connected user equipment (UE), means for determining whether the dually-connected UE may be transitioned to an idle state based on a small cell activity status for the dually-connected UE, and means for sending a state decision message to indicate whether the dually-connected UE may be transitioned to the idle state.

In Example 55, the wireless communication apparatus of Example 54 may optionally comprise means for determining the small cell activity status for the dually-connected UE based on whether there is ongoing data packet activity between the dually-connected UE and a secondary evolved node B (SeNB).

In Example 56, the wireless communication apparatus of Example 55 may optionally comprise means for determining that the small cell activity status for the dually-connected UE comprises an active status when there is ongoing data packet activity between the dually-connected UE and the SeNB.

In Example 57, the wireless communication apparatus of Example 55 may optionally comprise means for determining that the small cell activity status for the dually-connected UE comprises an inactive status when there is no ongoing data packet activity between the dually-connected UE and the SeNB.

In Example 58, the wireless communication apparatus of any of Examples 54 to 57 may optionally comprise means for determining the small cell activity status for the dually-connected UE based on a secondary inactivity timer for the dually-connected UE.

In Example 59, the wireless communication apparatus of Example 58 may optionally comprise means for determining that the small cell activity status for the dually-connected UE comprises an active status when secondary inactivity timer for the dually-connected UE is running.

In Example 60, the wireless communication apparatus of Example 58 may optionally comprise means for determining that the small cell activity status for the dually-connected UE comprises an inactive status when secondary inactivity timer for the dually-connected UE is expired.

In Example 61, the wireless communication apparatus of any of Examples 54 to 60 may optionally comprise means for determining that the dually-connected UE may not be transitioned to the idle state in response to a determination that the small cell activity status for the dually-connected UE comprises an active status.

In Example 62, the wireless communication apparatus of Example 61 may optionally comprise means for detecting an expiration of a secondary inactivity timer for the dually-connected UE, and means for sending a second inactivity notification message indicating the expiration of the secondary inactivity timer for the dually-connected UE.

In Example 63, the wireless communication apparatus of Example 62 may optionally comprise means for sending a first control message to indicate an idle-pending condition for the dually-connected UE.

In Example 64, the first control message of Example 63 may optionally comprise a medium access control (MAC) control element (CE).

In Example 65, the MAC CE of Example 64 may optionally comprise a five-bit logical channel identifier (LCID) value from among the range 01011 to 11001.

In Example 66, the wireless communication apparatus of any of Examples 62 to 65 may optionally comprise means for receiving a state notification message in response to the second inactivity notification message.

In Example 67, the wireless communication apparatus of Example 66 may optionally comprise means for sending a second control message in response to a determination that the state notification message indicates that the dually-connected UE is not being transitioned to the idle state, the second control message to indicate that the idle-pending condition for the dually-connected UE has ended.

In Example 68, the second control message of Example 67 may optionally comprise a same MAC CE as the first control message.

In Example 69, the wireless communication apparatus of any of Examples 66 to 68 may optionally comprise means for exchanging one or more deferred data packets in response to a determination that the state notification message indicates that the dually-connected UE is not being transitioned to the idle state.

In Example 70, the wireless communication apparatus of any of Examples 54 to 60 may optionally comprise means for determining that the dually-connected UE may be transitioned to the idle state in response to a determination that the small cell activity status for the dually-connected UE comprises an inactive status.

In Example 71, the wireless communication apparatus of Example 70 may optionally comprise means for sending a state decision message to indicate that the dually-connected UE may be transitioned to the idle state and send a control message to indicate an idle-pending condition for the dually-connected UE.

In Example 72, the control message of Example 71 may optionally comprise a medium access control (MAC) control element (CE).

In Example 73, the wireless communication apparatus of any of Examples 54 to 72 may optionally comprise means for sending the state decision message to a master evolved node B (MeNB) for the dually-connected UE.

In Example 74, the wireless communication apparatus of any of Examples 54 to 73 may optionally comprise means for sending the state decision message over an X2 interface connection.

In Example 75, the X2 interface connection of Example 74 may optionally be implemented using a non-ideal backhaul.

In Example 76, the master inactivity timer of any of Examples 54 to 75 may optionally comprise an RRC_Inactivity_Timer for the dually-connected UE.

Example 77 is a system, comprising a wireless communication apparatus according to any of Examples 54 to 76, a radio frequency (RF) transceiver, and one or more RF antennas.

Example 78 is at least one non-transitory computer-readable storage medium, comprising a set of wireless communication instructions that, in response to being executed on user equipment (UE), cause the UE to initiate a connectivity procedure to cause the UE to enter a dual-connectivity mode of operation, and in response to a receipt of a first control message indicating that the UE is subject to an idle-pending condition, defer transmission of one or more small-cell uplink (UL) data packets.

In Example 79, the connectivity procedure of Example 78 may optionally comprise establishing concurrent data connectivity with a master evolved node B (MeNB) and a secondary evolved node B (SeNB).

In Example 80, the first control message of any of Examples 78 to 79 may optionally comprise a medium access control (MAC) control element (CE).

In Example 81, the at least one non-transitory computer-readable storage medium of any of Examples 78 to 80 may optionally comprise wireless communication instructions that, in response to being executed on the UE, cause the UE to enter an RRC_Idle state in response to a receipt of a connection release command while the UE is subject to the idle-pending condition.

In Example 82, the at least one non-transitory computer-readable storage medium of any of Examples 78 to 80 may optionally comprise wireless communication instructions that, in response to being executed on the UE, cause the UE to exchange one or more deferred small-cell data packets over a wireless connection in response to receipt of a second control message indicating that the UE is no longer subject to the idle-pending condition.

In Example 83, the second control message of Example 82 may optionally comprise a same medium access control (MAC) control element (CE) as the first control message.

Example 84 is a wireless communication method, comprising sending an inactivity notification message to indicate an expiration of a master inactivity timer for a dually-connected user equipment (UE), receiving a state decision message in response to the inactivity notification message, and determining, by a processor circuit, whether to transition the dually-connected UE to an idle state based on the state decision message.

In Example 85, the wireless communication method of Example 84 may optionally comprise sending the inactivity notification message to initiate a radio resource control (RRC) state management handshake for determining whether to transition the dually-connected UE to the idle state.

In Example 86, the wireless communication method of any of Examples 84 to 85 may optionally comprise sending the inactivity notification message to a secondary evolved node B (SeNB) for the dually-connected UE.

In Example 87, the wireless communication method of any of Examples 84 to 86 may optionally comprise sending the inactivity notification message over an X2 interface connection.

In Example 88, the X2 interface connection of Example 87 may optionally be implemented using a non-ideal backhaul.

In Example 89, the wireless communication method of any of Examples 84 to 88 may optionally comprise sending the inactivity notification message in advance of the expiration of the master inactivity timer.

In Example 90, the master inactivity timer of any of Examples 84 to 89 may optionally comprise an RRC_Inactivity_Timer for the dually-connected UE.

In Example 91, the wireless communication method of any of Examples 84 to 90 may optionally comprise resetting the master inactivity timer in response to a receipt of a data packet from the dually-connected UE.

In Example 92, the wireless communication method of Example 84 to 91 may optionally comprise transitioning the dually-connected UE to the idle state in response to a determination that the state decision message indicates that the dually-connected UE may be transitioned to the idle state.

In Example 93, the wireless communication method of Example 92 may optionally comprise sending a connection release command to transition the dually-connected UE to the idle state.

In Example 94, the wireless communication method of any of Examples 92 to 93 may optionally comprise sending a state notification message to indicate that the dually-connected UE is being transitioned to the idle state.

In Example 95, the idle state of any of Examples 84 to 94 may optionally comprise an RRC_Idle state.

In Example 96, the wireless communication method of any of Examples 84 to 91 may optionally comprise maintaining the dually-connected UE in a connected state in response to a determination that the state decision message indicates that the dually-connected UE may not be transitioned to the idle state.

In Example 97, the wireless communication method of Example 96 may optionally comprise resetting the master inactivity timer in response to the determination that the state decision message indicates that the dually-connected UE may not be transitioned to the idle state.

In Example 98, the wireless communication method of any of Examples 84 to 91 may optionally comprise maintaining the dually-connected UE in a provisional connected state in response to a determination that the state decision message indicates that the dually-connected UE may not be transitioned to the idle state.

In Example 99, the wireless communication method of Example 98 may optionally comprise determining whether to transition the dually-connected UE to the idle state or maintain the dually-connected UE in a connected state in response to receipt of a second inactivity notification message indicating an expiration of a secondary inactivity timer for the dually-connected UE.

In Example 100, the wireless communication method of Example 99 may optionally comprise determining whether to transition the dually-connected UE to the idle state or maintain the dually-connected UE in a connected state based on whether the master inactivity timer for the dually-connected UE is running or expired.

In Example 101, the wireless communication method of Example 100 may optionally comprise transitioning the dually-connected UE to the idle state in response to a determination that the master inactivity timer for the dually-connected UE is expired.

In Example 102, the wireless communication method of Example 100 may optionally comprise maintaining the dually-connected UE in the connected state in response to a determination that the master inactivity timer for the dually-connected UE is running.

Example 103 is at least one non-transitory computer-readable storage medium, comprising a set of instructions that, in response to being executed at a master evolved node B (MeNB), cause the MeNB to perform a wireless communication method according to any of Examples 84 to 102.

Example 104 is an apparatus, comprising means for performing a wireless communication method according to any of Examples 84 to 102.

Example 105 is a system, comprising an apparatus according to Example 104, a radio frequency (RF) transceiver, and one or more RF antennas.

Example 106 is a wireless communication apparatus, comprising means for initiating a connectivity procedure to cause user equipment (UE) to enter a dual-connectivity mode of operation, and means for deferring transmission of one or more small-cell uplink (UL) data packets in response to a receipt of a first control message indicating that the UE is subject to an idle-pending condition.

In Example 107, the connectivity procedure of Example 106 may optionally comprise establishing concurrent data connectivity with a master evolved node B (MeNB) and a secondary evolved node B (SeNB).

In Example 108, the first control message of any of Examples 106 to 107 may optionally comprise a medium access control (MAC) control element (CE).

In Example 109, the wireless communication apparatus of any of Examples 106 to 108 may optionally comprise means for causing the UE to enter an RRC_Idle state in response to a receipt of a connection release command while the UE is subject to the idle-pending condition.

In Example 110, the wireless communication apparatus of any of Examples 106 to 108 may optionally comprise means for exchanging one or more deferred small-cell data packets over a wireless connection in response to receipt of a second control message indicating that the UE is no longer subject to the idle-pending condition.

In Example 111, the second control message of Example 110 may optionally comprise a same medium access control (MAC) control element (CE) as the first control message.

Example 112 is a system, comprising a wireless communication apparatus according to any of Examples 106 to 111, a radio frequency (RF) transceiver, and one or more RF antennas.

In Example 113, the system of Example 112 may optionally comprise a display.

Example 114 is a secondary evolved node B (SeNB), comprising logic, at least a portion of which is in hardware, the logic to receive an inactivity notification message indicating an expiration of a master inactivity timer for a dually-connected user equipment (UE), determine whether the dually-connected UE may be transitioned to an idle state based on a small cell activity status for the dually-connected UE, and send a state decision message to indicate whether the dually-connected UE may be transitioned to the idle state.

In Example 115, the logic of Example 114 may optionally determine the small cell activity status for the dually-connected UE based on whether there is ongoing data packet activity between the dually-connected UE and the SeNB.

In Example 116, the logic of Example 115 may optionally determine that the small cell activity status for the dually-connected UE comprises an active status when there is ongoing data packet activity between the dually-connected UE and the SeNB.

In Example 117, the logic of Example 115 may optionally determine that the small cell activity status for the dually-connected UE comprises an inactive status when there is no ongoing data packet activity between the dually-connected UE and the SeNB.

In Example 118, the logic of any of Examples 114 to 117 may optionally determine the small cell activity status for the dually-connected UE based on a secondary inactivity timer for the dually-connected UE.

In Example 119, the logic of Example 118 may optionally determine that the small cell activity status for the dually-connected UE comprises an active status when secondary inactivity timer for the dually-connected UE is running.

In Example 120, the logic of Example 118 may optionally determine that the small cell activity status for the dually-connected UE comprises an inactive status when secondary inactivity timer for the dually-connected UE is expired.

In Example 121, the logic of any of Examples 114 to 120 may optionally determine that the dually-connected UE may not be transitioned to the idle state in response to a determination that the small cell activity status for the dually-connected UE comprises an active status.

In Example 122, the logic of Example 121 may optionally detect an expiration of a secondary inactivity timer for the dually-connected UE and send a second inactivity notification message indicating the expiration of the secondary inactivity timer for the dually-connected UE.

In Example 123, the logic of Example 122 may optionally send a first control message to indicate an idle-pending condition for the dually-connected UE.

In Example 124, the first control message of Example 123 may optionally comprise a medium access control (MAC) control element (CE).

In Example 125, the MAC CE of Example 124 may optionally comprise a five-bit logical channel identifier (LCID) value from among the range 01011 to 11001.

In Example 126, the logic of any of Examples 122 to 125 may optionally receive a state notification message in response to the second inactivity notification message.

In Example 127, the logic of Example 126 may optionally send a second control message in response to a determination that the state notification message indicates that the dually-connected UE is not being transitioned to the idle state, the second control message to indicate that the idle-pending condition for the dually-connected UE has ended.

In Example 128, the second control message of Example 127 may optionally comprise a same MAC CE as the first control message.

In Example 129, the logic of Example 126 may optionally exchange one or more deferred data packets in response to a determination that the state notification message indicates that the dually-connected UE is not being transitioned to the idle state.

In Example 130, the logic of any of Examples 114 to 120 may optionally determine that the dually-connected UE may be transitioned to the idle state in response to a determination that the small cell activity status for the dually-connected UE comprises an inactive status.

In Example 131, the logic of Example 130 may optionally send a state decision message to indicate that the dually-connected UE may be transitioned to the idle state and send a control message to indicate an idle-pending condition for the dually-connected UE.

In Example 132, the control message of Example 131 may optionally comprise a medium access control (MAC) control element (CE).

In Example 133, the logic of any of Examples 114 to 132 may optionally send the state decision message to a master evolved node B (MeNB) for the dually-connected UE.

In Example 134, the logic of any of Examples 114 to 133 may optionally send the state decision message over an X2 interface connection.

In Example 135, the X2 interface connection of Example 134 may optionally be implemented using a non-ideal backhaul.

In Example 136, the master inactivity timer of any of Examples 114 to 135 may optionally comprise an RRC_Inactivity_Timer for the dually-connected UE.

In Example 137, the SeNB of any of Examples 114 to 136 may optionally comprise a radio frequency (RF) transceiver, and one or more RF antennas.

Example 138 is a wireless communication method, comprising receiving an inactivity notification message indicating an expiration of a master inactivity timer for a dually-connected user equipment (UE), determining, by a processor circuit, whether the dually-connected UE may be transitioned to an idle state based on a small cell activity status for the dually-connected UE, and sending a state decision message to indicate whether the dually-connected UE may be transitioned to the idle state.

In Example 139, the wireless communication method of Example 138 may optionally comprise determining the small cell activity status for the dually-connected UE based on whether there is ongoing data packet activity between the dually-connected UE and a secondary evolved node B (SeNB).

In Example 140, the wireless communication method of Example 139 may optionally comprise determining that the small cell activity status for the dually-connected UE comprises an active status when there is ongoing data packet activity between the dually-connected UE and the SeNB.

In Example 141, the wireless communication method of Example 139 may optionally comprise determining that the small cell activity status for the dually-connected UE comprises an inactive status when there is no ongoing data packet activity between the dually-connected UE and the SeNB.

In Example 142, the wireless communication method of any of Examples 138 to 141 may optionally comprise determining the small cell activity status for the dually-connected UE based on a secondary inactivity timer for the dually-connected UE.

In Example 143, the wireless communication method of Example 142 may optionally comprise determining that the small cell activity status for the dually-connected UE comprises an active status when secondary inactivity timer for the dually-connected UE is running.

In Example 144, the wireless communication method of Example 142 may optionally comprise determining that the small cell activity status for the dually-connected UE comprises an inactive status when secondary inactivity timer for the dually-connected UE is expired.

In Example 145, the wireless communication method of any of Examples 138 to 144 may optionally comprise determining that the dually-connected UE may not be transitioned to the idle state in response to a determination that the small cell activity status for the dually-connected UE comprises an active status.

In Example 146, the wireless communication method of Example 145 may optionally comprise detecting an expiration of a secondary inactivity timer for the dually-connected UE, and sending a second inactivity notification message indicating the expiration of the secondary inactivity timer for the dually-connected UE.

In Example 147, the wireless communication method of Example 146 may optionally comprise sending a first control message to indicate an idle-pending condition for the dually-connected UE.

In Example 148, the first control message of Example 147 may optionally comprise a medium access control (MAC) control element (CE).

In Example 149, the MAC CE of Example 148 may optionally comprise a five-bit logical channel identifier (LCID) value from among the range 01011 to 11001.

In Example 150, the wireless communication method of any of Examples 147 to 149 may optionally comprise receiving a state notification message in response to the second inactivity notification message.

In Example 151, the wireless communication method of Example 150 may optionally comprise sending a second control message in response to a determination that the state notification message indicates that the dually-connected UE is not being transitioned to the idle state, the second control message to indicate that the idle-pending condition for the dually-connected UE has ended.

In Example 152, the second control message of Example 151 may optionally comprise a same MAC CE as the first control message.

In Example 153, the wireless communication method of any of Examples 150 to 152 may optionally comprise exchanging one or more deferred data packets in response to a determination that the state notification message indicates that the dually-connected UE is not being transitioned to the idle state.

In Example 154, the wireless communication method of any of Examples 138 to 144 may optionally comprise determining that the dually-connected UE may be transitioned to the idle state in response to a determination that the small cell activity status for the dually-connected UE comprises an inactive status.

In Example 155, the wireless communication method of Example 154 may optionally comprise sending a state decision message to indicate that the dually-connected UE may be transitioned to the idle state and send a control message to indicate an idle-pending condition for the dually-connected UE.

In Example 156, the control message of Example 155 may optionally comprise a medium access control (MAC) control element (CE).

In Example 157, the wireless communication method of any of Examples 138 to 156 may optionally comprise sending the state decision message to a master evolved node B (MeNB) for the dually-connected UE.

In Example 158, the wireless communication method of any of Examples 138 to 157 may optionally comprise sending the state decision message over an X2 interface connection.

In Example 159, the X2 interface connection of Example 158 may optionally be implemented using a non-ideal backhaul.

In Example 160, the master inactivity timer of any of Examples 138 to 159 may optionally comprise an RRC_Inactivity_Timer for the dually-connected UE.

Example 161 is at least one non-transitory computer-readable storage medium, comprising a set of instructions that, in response to being executed at a secondary evolved node B (SeNB), cause the SeNB to perform a wireless communication method according to any of Examples 138 to 160.

Example 162 is an apparatus, comprising means for performing a wireless communication method according to any of Examples 138 to 160.

Example 163 is a system, comprising an apparatus according to Example 162, a radio frequency (RF) transceiver, and one or more RF antennas.

Example 164 is a wireless communication apparatus, comprising means for sending an inactivity notification message to indicate an expiration of a master inactivity timer for a dually-connected user equipment (UE), means for receiving a state decision message in response to the inactivity notification message, and means for determining whether to transition the dually-connected UE to an idle state based on the state decision message.

In Example 165, the wireless communication apparatus of Example 164 may optionally comprise means for sending the inactivity notification message to initiate a radio resource control (RRC) state management handshake for determining whether to transition the dually-connected UE to the idle state.

In Example 166, the wireless communication apparatus of any of Examples 164 to 165 may optionally comprise means for sending the inactivity notification message to a secondary evolved node B (SeNB) for the dually-connected UE.

In Example 167, the wireless communication apparatus of any of Examples 164 to 166 may optionally comprise means for sending the inactivity notification message over an X2 interface connection.

In Example 168, the X2 interface connection of Example 167 may optionally be implemented using a non-ideal backhaul.

In Example 169, the wireless communication apparatus of any of Examples 164 to 168 may optionally comprise means for sending the inactivity notification message in advance of the expiration of the master inactivity timer.

In Example 170, the master inactivity timer of any of Examples 164 to 169 may optionally comprise an RRC_Inactivity_Timer for the dually-connected UE.

In Example 171, the wireless communication apparatus of any of Examples 164 to 170 may optionally comprise means for resetting the master inactivity timer in response to a receipt of a data packet from the dually-connected UE.

In Example 172, the wireless communication apparatus of any of Examples 164 to 171 may optionally comprise means for transitioning the dually-connected UE to the idle state in response to a determination that the state decision message indicates that the dually-connected UE may be transitioned to the idle state.

In Example 173, the wireless communication apparatus of Example 172 may optionally comprise means for sending a connection release command to transition the dually-connected UE to the idle state.

In Example 174, the wireless communication apparatus of any of Examples 172 to 173 may optionally comprise means for sending a state notification message to indicate that the dually-connected UE is being transitioned to the idle state.

In Example 175, the idle state of any of Examples 164 to 174 may optionally comprise an RRC_Idle state.

In Example 176, the wireless communication apparatus of any of Examples 164 to 171 may optionally comprise means for maintaining the dually-connected UE in a connected state in response to a determination that the state decision message indicates that the dually-connected UE may not be transitioned to the idle state.

In Example 177, the wireless communication apparatus of Example 176 may optionally comprise means for resetting the master inactivity timer in response to the determination that the state decision message indicates that the dually-connected UE may not be transitioned to the idle state.

In Example 178, the wireless communication apparatus of any of Examples 164 to 171 may optionally comprise means for maintaining the dually-connected UE in a provisional connected state in response to a determination that the state decision message indicates that the dually-connected UE may not be transitioned to the idle state.

In Example 179, the wireless communication apparatus of Example 178 may optionally comprise means for determining whether to transition the dually-connected UE to the idle state or maintain the dually-connected UE in a connected state in response to receipt of a second inactivity notification message indicating an expiration of a secondary inactivity timer for the dually-connected UE.

In Example 180, the wireless communication apparatus of Example 179 may optionally comprise means for determining whether to transition the dually-connected UE to the idle state or maintain the dually-connected UE in a connected state based on whether the master inactivity timer for the dually-connected UE is running or expired.

In Example 181, the wireless communication apparatus of Example 180 may optionally comprise means for transitioning the dually-connected UE to the idle state in response to a determination that the master inactivity timer for the dually-connected UE is expired.

In Example 182, the wireless communication apparatus of Example 180 may optionally comprise means for maintaining the dually-connected UE in the connected state in response to a determination that the master inactivity timer for the dually-connected UE is running.

Example 183 is a system, comprising a wireless communication apparatus according to any of Examples 164 to 182, a radio frequency (RF) transceiver, and one or more RF antennas.

Example 184 is user equipment (UE), comprising logic, at least a portion of which is in hardware, the logic to initiate a connectivity procedure to cause the UE to enter a dual-connectivity mode of operation and, in response to a receipt of a first control message indicating that the UE is subject to an idle-pending condition, defer transmission of one or more small-cell uplink (UL) data packets.

In Example 185, the connectivity procedure of Example 184 may optionally comprise establishing concurrent data connectivity with a master evolved node B (MeNB) and a secondary evolved node B (SeNB).

In Example 186, the first control message of any of Examples 184 to 185 may optionally comprise a medium access control (MAC) control element (CE).

In Example 187, the logic of any of Examples 184 to 186 may optionally cause the UE to enter an RRC_Idle state in response to a receipt of a connection release command while the UE is subject to the idle-pending condition.

In Example 188, the logic of any of Examples 184 to 186 may optionally exchange one or more deferred small-cell data packets over a wireless connection in response to receipt of a second control message indicating that the UE is no longer subject to the idle-pending condition.

In Example 189, the second control message of Example 188 may optionally comprise a same medium access control (MAC) control element (CE) as the first control message.

In Example 190, the UE of any of Examples 184 to 189 may optionally comprise a radio frequency (RF) transceiver, and one or more RF antennas.

In Example 191, the UE of Example 190 may optionally comprise a display.

Example 192 is at least one non-transitory computer-readable storage medium, comprising a set of wireless communication instructions that, in response to being executed on a computing device, cause a master evolved node B (MeNB) to send an inactivity notification message to indicate an expiration of a master inactivity timer for a dually-connected user equipment (UE), receive a state decision message in response to the inactivity notification message, and determine whether to transition the dually-connected UE to an idle state based on the state decision message.

In Example 193, the at least one non-transitory computer-readable storage medium of Example 192 may optionally comprise wireless communication instructions that, in response to being executed on the computing device, cause the MeNB to send the inactivity notification message to initiate a radio resource control (RRC) state management handshake for determining whether to transition the dually-connected UE to the idle state.

In Example 194, the at least one non-transitory computer-readable storage medium of any of Examples 192 to 193 may optionally comprise wireless communication instructions that, in response to being executed on the computing device, cause the MeNB to send the inactivity notification message to a secondary evolved node B (SeNB) for the dually-connected UE.

In Example 195, the at least one non-transitory computer-readable storage medium of any of Examples 192 to 194 may optionally comprise wireless communication instructions that, in response to being executed on the computing device, cause the MeNB to send the inactivity notification message over an X2 interface connection.

In Example 196, the X2 interface connection of Example 195 may optionally be implemented using a non-ideal backhaul.

In Example 197, the at least one non-transitory computer-readable storage medium of any of Examples 192 to 196 may optionally comprise wireless communication instructions that, in response to being executed on the computing device, cause the MeNB to send the inactivity notification message in advance of the expiration of the master inactivity timer.

In Example 198, the master inactivity timer of any of Examples 192 to 197 may optionally comprise an RRC_Inactivity_Timer for the dually-connected UE.

In Example 199, the at least one non-transitory computer-readable storage medium of any of Examples 192 to 198 may optionally comprise wireless communication instructions that, in response to being executed on the computing device, cause the MeNB to reset the master inactivity timer in response to a receipt of a data packet from the dually-connected UE.

In Example 200, the at least one non-transitory computer-readable storage medium of any of Examples 192 to 199 may optionally comprise wireless communication instructions that, in response to being executed on the computing device, cause the MeNB to transition the dually-connected UE to the idle state in response to a determination that the state decision message indicates that the dually-connected UE may be transitioned to the idle state.

In Example 201, the at least one non-transitory computer-readable storage medium of Example 200 may optionally comprise wireless communication instructions that, in response to being executed on the computing device, cause the MeNB to send a connection release command to transition the dually-connected UE to the idle state.

In Example 202, the at least one non-transitory computer-readable storage medium of any of Examples 200 to 201 may optionally comprise wireless communication instructions that, in response to being executed on the computing device, cause the MeNB to send a state notification message to indicate that the dually-connected UE is being transitioned to the idle state.

In Example 203, the idle state of any of Examples 192 to 202 may optionally comprise an RRC_Idle state.

In Example 204, the at least one non-transitory computer-readable storage medium of any of Examples 192 to 199 may optionally comprise wireless communication instructions that, in response to being executed on the computing device, cause the MeNB to maintain the dually-connected UE in a connected state in response to a determination that the state decision message indicates that the dually-connected UE may not be transitioned to the idle state.

In Example 205, the at least one non-transitory computer-readable storage medium of Example 204 may optionally comprise wireless communication instructions that, in response to being executed on the computing device, cause the MeNB to reset the master inactivity timer in response to the determination that the state decision message indicates that the dually-connected UE may not be transitioned to the idle state.

In Example 206, the at least one non-transitory computer-readable storage medium of any of Examples 192 to 199 may optionally comprise wireless communication instructions that, in response to being executed on the computing device, cause the MeNB to maintain the dually-connected UE in a provisional connected state in response to a determination that the state decision message indicates that the dually-connected UE may not be transitioned to the idle state.

In Example 207, the at least one non-transitory computer-readable storage medium of Example 206 may optionally comprise wireless communication instructions that, in response to being executed on the computing device, cause the MeNB to determine whether to transition the dually-connected UE to the idle state or maintain the dually-connected UE in a connected state in response to receipt of a second inactivity notification message indicating an expiration of a secondary inactivity timer for the dually-connected UE.

In Example 208, the at least one non-transitory computer-readable storage medium of Example 207 may optionally comprise wireless communication instructions that, in response to being executed on the computing device, cause the MeNB to determine whether to transition the dually-connected UE to the idle state or maintain the dually-connected UE in a connected state based on whether the master inactivity timer for the dually-connected UE is running or expired.

In Example 209, the at least one non-transitory computer-readable storage medium of Example 208 may optionally comprise wireless communication instructions that, in response to being executed on the computing device, cause the MeNB to transition the dually-connected UE to the idle state in response to a determination that the master inactivity timer for the dually-connected UE is expired.

In Example 210, the at least one non-transitory computer-readable storage medium of Example 208 may optionally comprise wireless communication instructions that, in response to being executed on the computing device, cause the MeNB to maintain the dually-connected UE in the connected state in response to a determination that the master inactivity timer for the dually-connected UE is running.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A master evolved node B (MeNB), comprising:
   logic, at least a portion of which is in hardware, the logic to send an inactivity notification message to a secondary evolved node B (SeNB) over an X2 interface connection implemented using a non-ideal backhaul, the inactivity notification message to indicate a prospective expiration of an RRC_Inactivity_Timer for a dually-connected user equipment (UE), receive a state decision message in response to the inactivity notification message, and determine whether to transition the dually-connected UE to an RRC_Idle state based on the state decision message, the logic to send the inactivity notification message in advance of the prospective expiration of the RRC_Inactivity_Timer for the dually-connected UE to account for a non-ideal backhaul latency associated with communications over the X2 interface connection.

2. The MeNB of claim 1, the logic to reset the master inactivity timer and maintain the dually-connected UE in an RRC_Connected state in response to a determination that the state decision message indicates that the dually-connected UE may not be transitioned to the RRC_Idle state.

3. The MeNB of claim 1, the logic to maintain the dually-connected UE in a provisional RRC_Connected state in response to a determination that the state decision message indicates that the dually-connected UE may not be transitioned to the RRC_Idle state.

4. The MeNB of claim 3, the logic to determine whether to transition the dually-connected UE to the RRC_Idle state or maintain the dually-connected UE in the RRC_Connected state in response to receipt of a second inactivity notification message indicating an expiration of a secondary inactivity timer for the dually-connected UE, based on whether the RRC_Inactivity_Timer for the dually-connected UE is expired or running.

5. The MeNB of claim 1, the logic to send a connection release command to transition the dually-connected UE to the RRC_Idle state in response to a determination that the state decision message indicates that the dually-connected UE may be transitioned to the RRC_Idle state.

6. The MeNB of claim 5, the logic to send a state notification message to indicate that the dually-connected UE is being transitioned to the RRC_Idle state.

7. The MeNB of claim 1, comprising:
   a radio frequency (RF) transceiver; and
   one or more RF antennas.

8. A secondary evolved node B (SeNB), comprising:
   logic, at least a portion of which is in hardware, the logic
      to receive an inactivity notification message indicating a prospective expiration of a master inactivity timer for a dually-connected user equipment (UE);
      determine a small cell activity status for the dually-connected UE; and
      based on a determination that the small cell activity status for the dually-connected UE comprises an active status:
         send a state decision message to indicate that the dually-connected UE may not be transitioned to an RRC_Idle state; and
      in response to the detecting an expiration of a secondary inactivity timer for the dually-connected UE:
         send a second inactivity notification message indicating the expiration of the secondary inactivity timer for the dually-connected UE; and
         send a first control message to indicate an idle-pending condition for the dually-connected UE, the first control message to comprise a medium access control (MAC) control element (CE).

9. The SeNB of claim 8, the logic to determine the small cell activity status for the dually-connected UE based on the secondary inactivity timer for the dually-connected UE.

10. The SeNB of claim 8, the logic to determine the small cell activity status for the dually-connected UE based on whether there is ongoing data packet activity between the dually-connected UE and the SeNB.

11. The SeNB of claim 8, the logic to determine that the dually-connected UE may be transitioned to the idle state in response to a determination that the small cell activity status for the dually-connected UE comprises an inactive status.

12. The SeNB of claim 8, the MAC CE comprising a five-bit logical channel identifier (LCID) value from among the range 01011 to 11001.

13. The SeNB of claim 8, the logic to receive a state notification message in response to the second inactivity notification message, and in response to a determination that the state notification message indicates that the dually-connected UE is not being transitioned to the RRC_Idle state, send a second control message to indicate that the idle-pending condition for the dually-connected UE has ended.

14. The SeNB of claim 13, the second control message comprising a same medium access control (MAC) control element (CE) as the first control message.

15. User equipment (UE), comprising:
   a display;
   a radio frequency (RF) transceiver;
   one or more RF antennas; and
   logic, at least a portion of which is in hardware, the logic to initiate a connectivity procedure to cause the UE to enter a dual-connectivity mode of operation and, in response to a receipt of a first control message indicating that the UE is subject to an idle-pending condition, defer transmission of one or more small-cell uplink (UL) data packets, the first control message comprising a medium access control (MAC) control element (CE), the MAC CE comprising a five-bit logical channel identifier (LCID) value.

16. The UE of claim 15, the connectivity procedure comprising establishing concurrent data connectivity with a master evolved node B (MeNB) and a secondary evolved node B (SeNB).

17. The UE of claim 15, the logic to cause the UE to enter an RRC_Idle state in response to a receipt of a connection release command while the UE is subject to the idle-pending condition.

18. The UE of claim 15, the logic to exchange one or more deferred small-cell data packets over a wireless connection in response to receipt of a second control message indicating that the UE is no longer subject to the idle-pending condition.

19. The UE of claim 18, the second control message comprising a same medium access control (MAC) control element (CE) as the first control message.

\* \* \* \* \*